US012701321B2

(12) United States Patent
Xu

(10) Patent No.: US 12,701,321 B2
(45) Date of Patent: Aug. 4, 2026

(54) METHOD AND ELECTRONIC DEVICE FOR PROCESSING IMAGE PREVIEW REQUESTS AND IMAGE SHOOTING REQUESTS

(71) Applicant: Honor Device Co., Ltd., Shenzhen (CN)

(72) Inventor: Jirun Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 22 days.

(21) Appl. No.: 18/841,177

(22) PCT Filed: Apr. 13, 2023

(86) PCT No.: PCT/CN2023/088068
§ 371 (c)(1),
(2) Date: Aug. 23, 2024

(87) PCT Pub. No.: WO2024/040990
PCT Pub. Date: Feb. 29, 2024

(65) Prior Publication Data
US 2025/0168491 A1 May 22, 2025

(30) Foreign Application Priority Data

Aug. 24, 2022 (CN) .......................... 202211018122.4

(51) Int. Cl.
*H04N 23/63* (2023.01)
*H04N 23/62* (2023.01)
*H04N 23/70* (2023.01)
(52) U.S. Cl.
CPC ........... *H04N 23/632* (2023.01); *H04N 23/62* (2023.01); *H04N 23/70* (2023.01)

(58) Field of Classification Search
CPC .......... H04M 1/72403; H04M 2250/52; H04N 23/60; H04N 23/62; H04N 23/631; H04N 23/632; H04N 23/70
See application file for complete search history.

(56) References Cited

U.S. PATENT DOCUMENTS

2013/0135510 A1    5/2013  Lee et al.
2013/0208143 A1    8/2013  Chou et al.
(Continued)

FOREIGN PATENT DOCUMENTS

CN          110719409 A      1/2020
CN          110881104 A   *  3/2020  ............. H04N 23/62
(Continued)

*Primary Examiner* — Antoinette T Spinks
(74) *Attorney, Agent, or Firm* — Slater Matsil, LLP

(57) ABSTRACT

Embodiments of this application provide a photographing method and an electronic device. In the method, the electronic device displays an image preview interface of a target application, where the target application is an application with a camera function, and a preview image frame displayed in the image preview interface is collected based on an image preview request continuously delivered by the target application; the target application generates an image shooting request in response to a received user operation, where an exposure parameter of the image shooting request is different from an exposure parameter of the image preview request; and if both the unprocessed image preview request and the unprocessed image shooting request exist, the electronic device invokes an image sensor to collect a shot image frame corresponding to the image shooting request.

20 Claims, 17 Drawing Sheets

(56)       References Cited

U.S. PATENT DOCUMENTS

| 2022/0150416 | A1 | | 5/2022 | Wang |
| 2023/0276136 | A1 | | 8/2023 | Cui et al. |
| 2025/0133297 | A1 | * | 4/2025 | Xu ......................... H04N 23/71 |

FOREIGN PATENT DOCUMENTS

| CN | 110913138 | A | | 3/2020 | |
| CN | 111447370 | A | | 7/2020 | |
| CN | 112217990 | A | | 1/2021 | |
| CN | 112532859 | A | * | 3/2021 | ............. H04N 23/62 |
| CN | 112738414 | A | * | 4/2021 | ........... H04N 23/745 |
| CN | 112954222 | A | * | 6/2021 | ........... H04N 23/632 |

* cited by examiner

METHOD AND ELECTRONIC DEVICE FOR PROCESSING IMAGE PREVIEW REQUESTS AND IMAGE SHOOTING REQUESTS

CROSS-REFERENCE TO RELATED APPLICATIONS

This application is a national stage of International Application No. PCT/CN2023/088068, filed on Apr. 13, 2023, which claims priority to Chinese Patent Application No. 202211018122.4, filed on Aug. 24, 2022. The disclosures of both of the aforementioned applications are hereby incorporated by reference in their entireties.

TECHNICAL FIELD

This application relates to the field of intelligent terminal technologies, and in particular, to a photographing method and an electronic device.

BACKGROUND

With increasing improvement of a function of an electronic device, people's requirement for a photographing effect of the electronic device is constantly improved.

When a user enables a photographing function of the electronic device, a preview picture is generally displayed on a display screen of the electronic device. When the electronic device captures a desired picture of the user, the user taps a photographing control for photographing. To improve photographing quality, an image to be finally output is generally composited based on an image frame collected by the electronic device in a state of a preview picture and an image frame obtained in response to a photographing operation of the user. How to shorten time of outputting an image is a problem that needs to be resolved.

SUMMARY

To resolve the foregoing technical problem, embodiments of this application provide a photographing method and an electronic device. An image shooting request with a changed image exposure parameter is preferentially processed by skipping an image preview request, thereby shortening image output duration of a shot image frame with a changed exposure parameter.

According to a first aspect, an embodiment of this application provides a photographing method. The method is applied to an electronic device, and includes:

The electronic device displays an image preview interface of a target application, where the target application is an application with a camera function, and a preview image frame displayed in the image preview interface is collected based on an image preview request continuously delivered by the target application;

the target application generates an image shooting request in response to a received user operation, where an exposure parameter of the image shooting request is different from an exposure parameter of the image preview request; and if both the unprocessed image preview request and the unprocessed image shooting request exist, the electronic device invokes an image sensor to collect a shot image frame corresponding to the image shooting request.

Exposure parameters of the shot image frame and the preview image frame are different.

In a process in which the target application displays the image preview interface, the target application may deliver an image preview request based on a preset frequency, to continuously collect a preview image frame corresponding to each image preview request, so as to ensure display fluency and smoothness of the preview image frame in the image preview interface of the target application.

In this way, the image shooting request with a changed image exposure parameter is preferentially processed by skipping the image preview request, thereby shortening image output duration of the shot image frame with a changed exposure parameter.

According to the first aspect, the method further includes: The image preview request continuously delivered by the target application is stored in a request queue, and the image shooting request delivered by the target application is stored in a target module, where the request queue is a first in first out queue.

For example, the target module may be a Bridge module mentioned below.

In this embodiment of this application, the target module is a module newly added to a system photographing path, and is configured to bridge a camera HAL module and an ISP module. The target module is a singleton class, and is configured to store image shooting requests with different image exposure parameters.

In this way, different from the existing technology, the image shooting request delivered by the target application is no longer stored in the request queue together with the image preview request, but is separately stored in the target module, to avoid a problem that the image shooting request can be processed only after processing of the image preview request that enters the queue earlier than the image shooting request is completed, thereby reducing a path delay of the image shooting request.

According to the first aspect or any implementation of the first aspect, that both the unprocessed image preview request and the unprocessed image shooting request exist may be specifically as follows: If the image preview request exists in the request queue and the image shooting request exists in the target module, the electronic device determines that both the unprocessed image preview request and the unprocessed image shooting request exist.

According to the first aspect or any implementation of the first aspect, the electronic device includes a camera hardware abstraction layer HAL module, an image signal processing ISP module, and an image sensor drive module, and the method includes:

The camera HAL module successively obtains one image preview request from the request queue, and sends the image preview request to the ISP module;

the ISP module receives the image preview request; and if reading an image shooting request from the target module, the ISP module sends the image shooting request to the image sensor drive module, so that the image sensor drive module drives the image sensor to collect a shot image frame corresponding to the image shooting request; or if reading no image shooting request from the target module, the ISP module sends the image preview request to the image sensor drive module, so that the image sensor drive module drives the image sensor to collect a preview image frame corresponding to the image preview request.

In this way, before sending the image preview request to the image sensor drive module, the ISP module first determines whether an image shooting request exists currently. If an image shooting request exists, the ISP module preferentially processes the image shooting request. Otherwise, the ISP module processes the image preview request. This ensures that the image shooting request can be processed in a timely manner, thereby reducing image output duration of the shot image frame.

According to the first aspect or any implementation of the first aspect, the method further includes: If reading an image shooting request from the target module, the ISP module discards the image preview request.

In this way, when both the unprocessed image preview request and the unprocessed image shooting request exist, the image shooting request is processed by replacing the image preview request, thereby reducing image output duration of the shot image frame by performing queue jump on the image shooting request. In addition, the replaced image preview request is discarded. This does not affect a subsequent image preview request.

According to the first aspect or any implementation of the first aspect, the method further includes: The camera HAL module receives an image preview request or an image shooting request that is delivered by the target application, stores the image preview request in the request queue, and stores the image shooting request in the target module.

According to the first aspect or any implementation of the first aspect, the method further includes: The ISP module sends, to the camera HAL module, a preview image frame or a shot image frame that is fed back by the image sensor drive module; and the camera HAL module successively stores the preview image frame or the shot image frame in a zero shutter lag queue.

According to the first aspect or any implementation of the first aspect, the method further includes: In a multi-frame composition shooting scenario, the camera HAL module reads a corresponding quantity of preview image frames and a corresponding quantity of shot image frames from the zero shutter lag queue, and performs a multi-frame image composition operation by using an image processing algorithm that matches a shooting mode, to obtain a target image, where the target image is used to be stored into a gallery application.

In this way, in a multi-frame composition photographing scenario, because the image shooting request skips each image preview request in the request queue, interframe space between the shot image frame corresponding to the image shooting request and the preview image frame in the ZSL queue is smaller, so that continuity of a plurality of frames of images used to composite an image to be finally output is better, and an image effect of multi-frame image composition is better. In particular, in a dynamic photographing scenario, "ghosting" may exist in an image frame collected by the image sensor. Therefore, smaller interframe space between the shot image frame and the preview image frame indicates a smaller image difference between the shot image frame and the preview image frame, so that a final image obtained through multi-frame image composition has a better effect, thereby avoiding a problem of motion blur in the image.

According to the first aspect or any implementation of the first aspect, the target application is a camera application.

According to a second aspect, an embodiment of this application provides an electronic device. The electronic device includes one or more processors; a memory; and one or more computer programs, where the one or more computer programs are stored in the memory, and when the one or more computer programs are executed by the one or more processors, the electronic device is enabled to perform the photographing method according to the first aspect and any implementation of the first aspect.

The second aspect and any implementation of the second aspect respectively correspond to the first aspect and any implementation of the first aspect. For technical effects corresponding to the second aspect and any implementation of the second aspect, refer to technical effects corresponding to the first aspect and any implementation of the first aspect. Details are not described herein again.

According to a third aspect, an embodiment of this application provides a computer-readable storage medium. The computer-readable storage medium includes a computer program. When the computer program is run on an electronic device, the electronic device is enabled to perform the photographing method according to the first aspect and any implementation of the first aspect.

The third aspect and any implementation of the third aspect respectively correspond to the first aspect and any implementation of the first aspect. For technical effects corresponding to the third aspect and any implementation of the third aspect, refer to technical effects corresponding to the first aspect and any implementation of the first aspect. Details are not described herein again.

According to a fourth aspect, an embodiment of this application provides a computer program product, including a computer program. When the computer program is run, a computer is enabled to perform the photographing method according to the first aspect or any implementation of the first aspect.

The fourth aspect and any implementation of the fourth aspect respectively correspond to the first aspect and any implementation of the first aspect. For technical effects corresponding to the fourth aspect and any implementation of the fourth aspect, refer to technical effects corresponding to the first aspect and any implementation of the first aspect. Details are not described herein again.

According to a fifth aspect, this application provides a chip, where the chip includes a processing circuit and a transceiver pin. The transceiver pin and the processing circuit communicate with each other by using an internal connection path, and the processing circuit performs the photographing method according to the first aspect or any implementation of the first aspect, to control a receive pin to receive a signal, and control a transmit pin to send a signal.

The fifth aspect and any implementation of the fifth aspect respectively correspond to the first aspect and any implementation of the first aspect. For technical effects corresponding to the fifth aspect and any implementation of the fifth aspect, refer to technical effects corresponding to the first aspect and any implementation of the first aspect. Details are not described herein again.

DETAILED DESCRIPTION OF ILLUSTRATIVE EMBODIMENTS

The following clearly and completely describes the technical solutions in the embodiments of this application with reference to the accompanying drawings in the embodiments of this application. Clearly, the described embodiments are some rather than all of the embodiments of this application. All other embodiments obtained by a person of ordinary skill in the art based on the embodiments of this application without creative efforts shall fall within the protection scope of this application.

In this specification, the term "and/or" is merely used to describe an association relationship between associated objects, and indicates that three relationships may exist. For example, A and/or B may indicate the following three cases: Only A exists, both A and B exist, and only B exists.

The terms "first", "second", and the like in the specification and claims of the embodiments of this application are used to distinguish between different objects, and are not used to describe a specific sequence of the objects. For example, a first target object, a second target object, and the like are used to distinguish between different target objects, but are not used to describe a specific sequence of the target objects.

In the embodiments of this application, words such as "example" or "for example" are used to indicate giving an example, an illustration, or a description. Any embodiment or design solution described as "an example" or "for example" in the embodiments of this application should not be explained as being more preferred or having more advantages than other embodiments or design solutions. Exactly, the words such as "example" or "for example" are used to present related concepts in a specific manner.

In the descriptions of the embodiments of this application, unless otherwise stated, "a plurality of" means two or more. For example, "a plurality of processing units" indicates two or more processing units, and "a plurality of systems" indicates two or more systems.

A photographing method provided in the embodiments of this application may be applied to an electronic device. Optionally, the electronic device in the embodiments of this application may be a mobile phone with a photographing function, an action camera (GoPro), a digital camera, a tablet computer, a desktop computer, a laptop computer, a hand-held computer, a notebook computer, a vehicle-mounted device, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, and the like. A specific form of the electronic device is not specially limited in the embodiments of this application.

Figure 1:
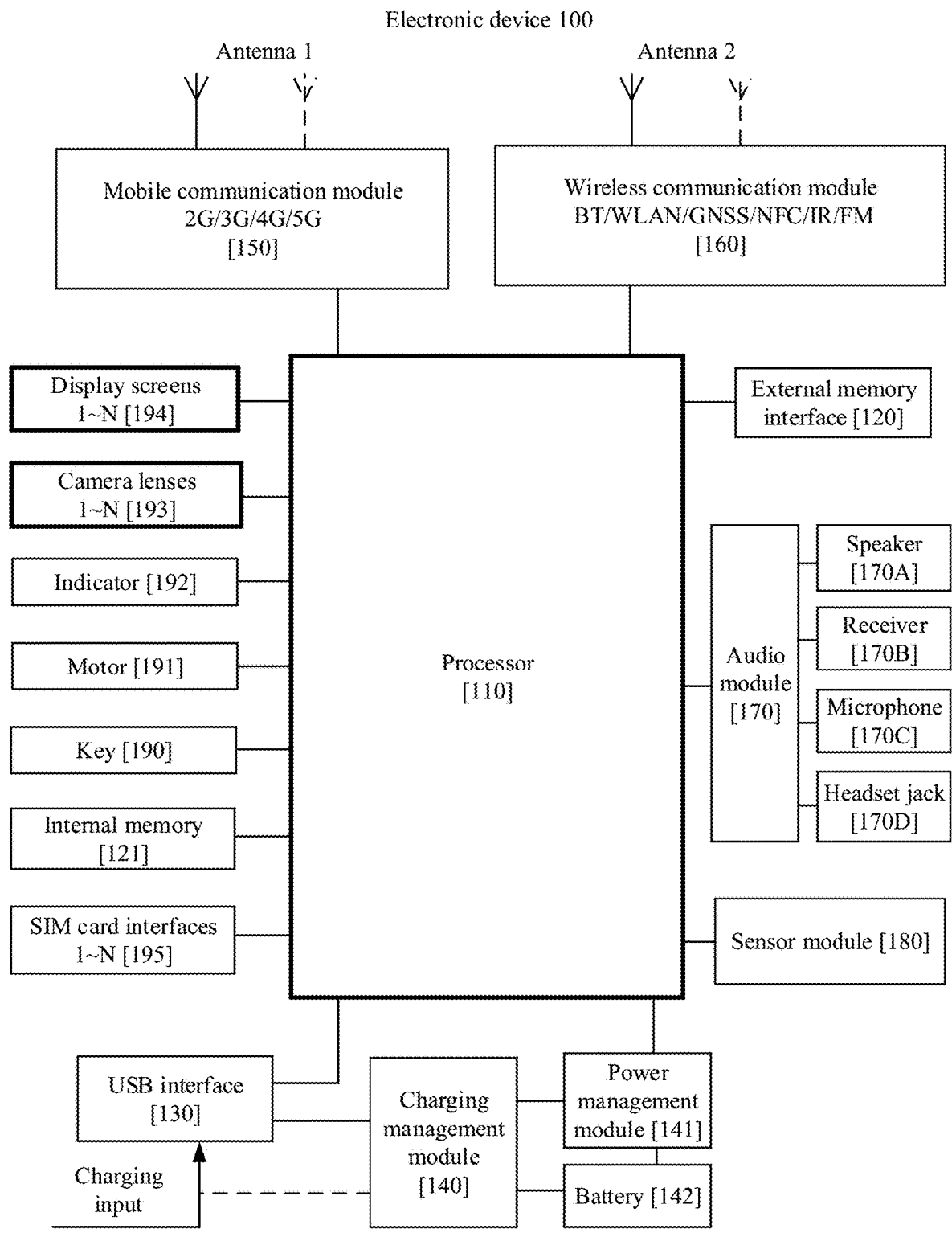
FIG. 1 is an example schematic diagram of a hardware structure of an electronic device.

FIG. 1 is a schematic diagram of a structure of an electronic device 100. Optionally, the electronic device 100 may be a terminal, or may be referred to as a terminal device. The terminal may be a device with a camera lens such as a cellular phone (cellular phone) (for example, a mobile phone) or a tablet computer (pad). This is not limited in this application. It should be understood that the electronic device 100 shown in FIG. 1 is only an example of the electronic device, and the electronic device 100 may have more or fewer components than those shown in the figure, may combine two or more components, or may have different component configurations. The various components shown in FIG. 1 may be implemented in hardware, software, or a combination of hardware and software including one or more signal processing and/or application-specific integrated circuits.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera lens 193, a display screen 194, and a subscriber identity module (subscriber identification module, SIM) card interface 195, and the like. The sensor module 180 may include a pressure sensor, a gyroscope sensor, an acceleration sensor, a temperature sensor, a motion sensor, a barometric pressure sensor, a magnetic sensor, a distance sensor, an optical proximity sensor, a fingerprint sensor, a touch sensor, an ambient light sensor, a bone conduction sensor, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a timing signal, to complete control of instruction fetching and instruction execution.

A memory may be further disposed in the processor 110, and is configured to store instructions and data. In some embodiments, the memory in the processor 110 is a cache.

The USB interface 130 is an interface that complies with USB standard specifications, and may be specifically a Mini USB interface, a Micro USB interface, a USB Type C interface, or the like. The USB interface 130 may be configured to be connected to a charger to charge the electronic device 100, or may be configured to transmit data between the electronic device 100 and a peripheral device, or may be configured to connect to a headset to play audio by using the headset. The interface may alternatively be configured to be connected to another electronic device, for example, an AR device.

The charging management module 140 is configured to receive charging input from a charger. The charger may be a wireless charger or a wired charger. In some embodiments of wired charging, the charging management module 140 may receive charging input from a wired charger by using the USB interface 130. In some embodiments of wireless charging, the charging management module 140 may receive wireless charging input by using a wireless charging coil of the electronic device 100. While charging the battery 142, the charging management module 140 may further supply power to the electronic device by using the power management module 141.

The power management module 141 is configured to be connected to the battery 142, the charging management module 140, and the processor 110. The power management module 141 receives input from the battery 142 and/or the charging management module 140, and supplies power to the processor 110, the internal memory 121, an external memory, the display screen 194, the camera lens 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication including 2G/3G/4G/5G and the like applied to the electronic device 100. The mobile communication module 150 may include at least one filter, switch, power amplifier, low noise amplifier (low noise amplifier, LNA), and the like.

The wireless communication module 160 may provide a solution to wireless communication that is applied to the electronic device 100 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology.

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculation for graphics rendering. The processor 110 may include one or more GPUs that execute program instructions to generate or change displayed information.

The display screen 194 is configured to display an image, a video, and the like. The display screen 194 includes a display panel. In some embodiments, the electronic device 100 may include one or N display screens 194, where N is a positive integer greater than 1.

The electronic device 100 may implement a shooting function by using the ISP, the camera lens 193, the video codec, the GPU, the display screen 194, the application processor, and the like.

The ISP is configured to process data fed back by the camera lens 193. For example, during photographing, a shutter is opened, and light is transmitted to a photosensitive element of the camera lens through a lens. An optical signal is converted into an electrical signal. The photosensitive element of the camera lens transmits the electrical signal to the ISP for processing, to convert the electrical signal into an image visible to naked eyes. The ISP may further perform algorithm optimization on noise, brightness, and complexion of the image. The ISP may further optimize parameters such as exposure and color temperature of a shooting scenario. In some embodiments, the ISP may be disposed in the camera lens 193.

The camera lens 193 is configured to capture a still image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N camera lenses 193, where N is a positive integer greater than 1.

The external memory interface 120 may be configured to connect to an external memory card, for example, a Micro SD card, to expand a storage capability of the electronic device 100. The external memory card communicates with the processor 110 by using the external memory interface 120, to implement a data storage function.

The internal memory 121 may be configured to store computer-executable program code, and the executable program code includes instructions. The processor 110 runs the instructions stored in the internal memory 121, to execute various function applications and data processing of the electronic device 100, for example, to enable the electronic device 100 to implement the photographing method in the embodiments of this application. The internal memory 121 may include a program storage region and a data storage region. The program storage region may store an operating system, an application required by at least one function (for example, a sound playing function or an image playing function), and the like. The data storage region may store data (such as audio data and a phone book) and the like created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function by using the audio module 170, the speaker 170A, the receiver 170B, the microphone 170C, the headset jack 170D, the application processor, and the like, for example, music playing and audio recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110 or some functional modules of the audio module 170 may be disposed in the processor 110.

The speaker 170A, also referred to as a "loudspeaker", is configured to convert an audio electrical signal into a sound signal. The electronic device 100 may listen to music or answer a call in a hands-free mode by using the speaker 170A. In some embodiments, a plurality of speakers 170A may be disposed in the electronic device 100.

The receiver 170B, also referred to as an "earpiece", is configured to convert an audio electrical signal into a sound signal. When a call is answered or a voice message is listened to by using the electronic device 100, the receiver 170B may be put close to a human ear to listen to a voice.

The microphone 170C, also referred to as a "mic" or "mike", is configured to convert a sound signal into an electrical signal. When making a call or sending a voice message, a user may make a sound by approaching the mouth to the microphone 170C, to input a sound signal to the microphone 170C. At least one microphone 170C may be disposed in the electronic device 100. In some other embodiments, two microphones 170C may be disposed in the electronic device 100, to implement a noise reduction function in addition to collecting a sound signal. In some other embodiments, three, four, or more microphones 170C may alternatively be disposed in the electronic device 100, to collect a sound signal, reduce noise, and identify a sound source, so as to implement a directional audio recording function and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor is configured to sense a pressure signal, and may convert the pressure signal into an electrical signal. In some embodiments, the pressure sensor may be disposed on the display screen 194. The electronic device 100 may also calculate a touch location based on a signal detected by the pressure sensor.

The gyroscope sensor may be configured to determine a motion posture of the electronic device 100. In some embodiments, angular velocities of the electronic device 100 around three axes (namely, an x axis, a y axis, and a z axis) may be determined by using the gyroscope sensor.

The acceleration sensor may detect magnitudes of acceleration in various directions (usually on three axes) of the electronic device 100. The acceleration sensor may detect a magnitude and a direction of gravity when the electronic device 100 is still. The acceleration sensor may be further configured to identify a posture of the electronic device, and is applied to applications such as landscape/portrait mode switching and a pedometer.

The touch sensor is also referred to as a "touch panel". The touch sensor may be disposed on the display screen 194. The touch sensor and the display screen 194 form a touchscreen, which is also referred to as a "touch control screen". The touch sensor is configured to detect a touch operation performed on or near the touch sensor. The touch sensor may transfer a detected touch operation to the application processor to determine a type of a touch event.

The key 190 includes an on/off key (or referred to as a power key), a volume key, or the like. The key 190 may be a mechanical key, or may be a touch key. The electronic device 100 may receive a key input and generate a key signal input related to user settings and function control of the electronic device 100.

The motor 191 may generate a vibration prompt. The motor 191 may be configured to provide a vibration prompt for an incoming call, and may be further configured to provide vibration feedback for a touch. For example, touch operations performed on different applications (for example, photographing and audio playing) may correspond to different vibration feedback effects.

The indicator 192 may be an indicator light, may be configured to indicate a charging status or a power change, and may be further configured to indicate a message, a missed incoming call, a notification, and the like.

A software system of the electronic device 100 may use a layered architecture, an event-driven architecture, a microkernel architecture, a microservice architecture, or a cloud architecture. It should be noted that, in the embodiments of this application, an operating system of the electronic device may include, but is not limited to, operating systems such as Symbian (Symbian), Android (Android), Windows, iOS (iOS), Blackberry, and HarmonyOS (Harmony). This is not limited in this application.

In the embodiments of this application, an Android system with a layered architecture is used as an example to describe a software structure of the electronic device 100.

Figure 2:
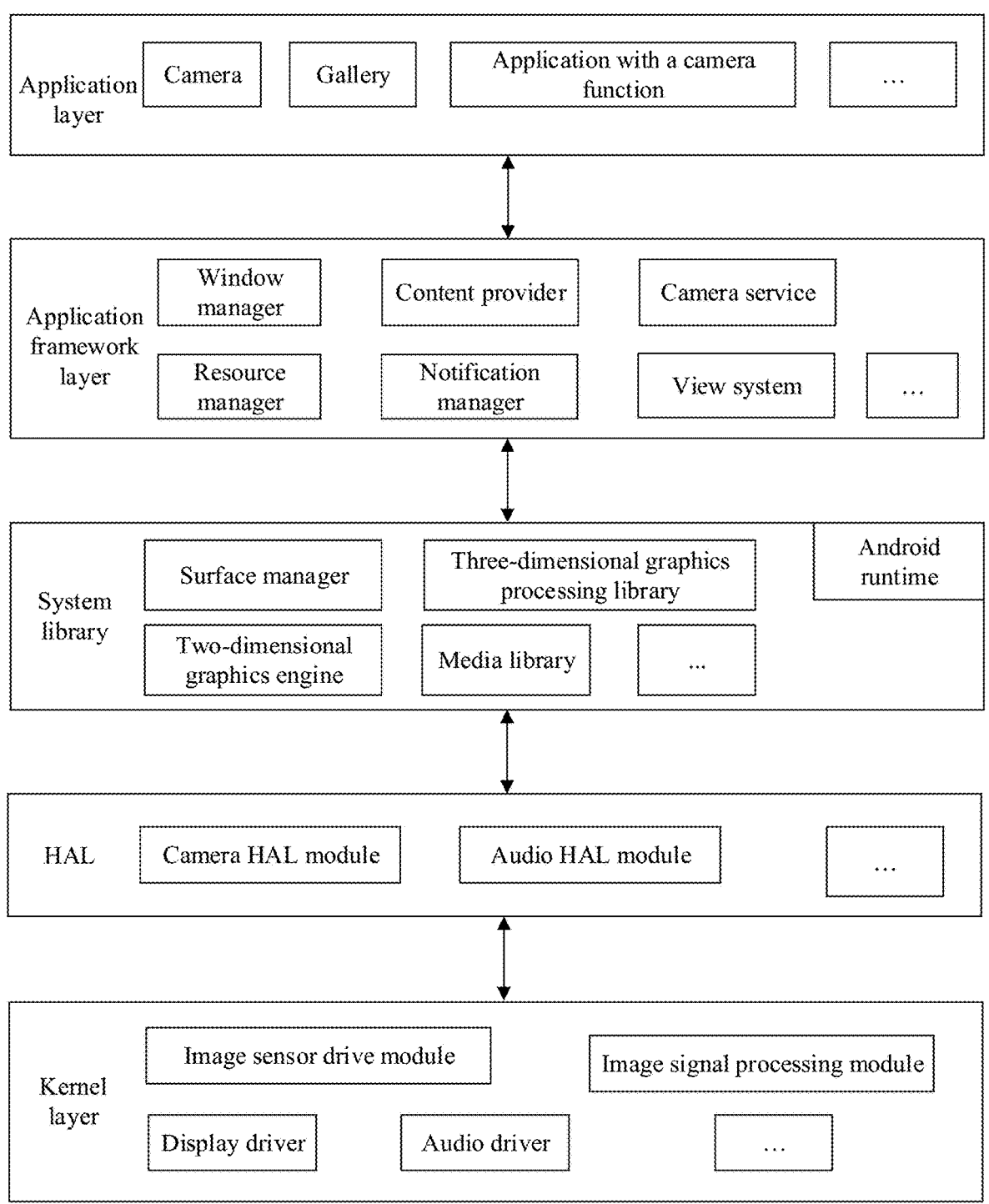
FIG. 2 is an example schematic diagram of a software structure of an electronic device.

FIG. 2 is a block diagram of a software architecture of the electronic device 100 according to an embodiment of this application.

In the layered architecture of the electronic device 100, software is divided into several layers, and each layer has a clear role and task. The layers communicate with each other by using a software interface. In some embodiments, the Android system is divided into four layers: an application layer, an application framework layer, an Android runtime (Android Runtime) and system library, a hardware abstraction layer (hardware abstraction layer, HAL), and a kernel layer from top to bottom.

The application layer may include a series of application packages.

As shown in FIG. 2, the application package may include Camera, Gallery, a third-party application with a camera function, and the like. For example, the application package may further include applications such as Phone, Calendar, Map, Navigation, Music, Video, and Messages.

The application framework layer provides an application programming interface (application programming interface, API) and a programming framework for applications at the application layer. The application framework layer includes some predefined functions.

As shown in FIG. 2, the application framework layer may include a window manager, a content provider, a view system, a resource manager, a notification manager, a camera service (Camera Service) and the like.

The window manager is configured to manage a window program. The window manager may obtain a size of a display screen, determine whether a status bar exists, lock a screen, take a screenshot, and the like.

The content provider is configured to store and obtain data, and enable the data to be accessible to an application. The data may include videos, images, audios, calls made and answered, browsing histories and bookmarks, phone books, and the like.

The view system includes visual controls such as a text display control and a picture display control. The view system may be configured to construct an application. A display interface may include one or more views. For example, a display interface including an SMS message notification icon may include a view for displaying text and a view for displaying a picture.

The resource manager provides various resources for an application, for example, a localized string, an icon, a picture, a layout file, and a video file.

The notification manager enables an application to display notification information in a status bar, and may be configured to convey a notification message that may automatically disappear after a short stay without requiring user interaction. For example, the notification information is configured to notify download completion, provide a message reminder, and the like. The notification information may be further a notification that appears in the status bar at the top of the system in a form of a graph or scroll bar text, for example, a notification of an application running in the background, or a notification that appears on a screen in a form of a dialog window. For example, the notification information is text information prompted in the status bar, a produced alert tone, vibration of the electronic device, or blinking of an indicator light.

The camera service is configured to invoke a camera lens (including a front-facing camera lens and/or a rear-facing camera lens) in response to a request of the application. Specifically, in this embodiment, the camera service may respond to an image preview request and an image shooting request that are delivered by the application, and further invoke, based on a corresponding request, the camera lens to collect an image, to obtain a corresponding image frame.

The Android Runtime includes a kernel library and a virtual machine. The Android Runtime is responsible for scheduling and management of the Android system.

The kernel library includes two parts: One part is a functional function that needs to be invoked in a java language, and the other part is a kernel library of Android.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of common audio and video formats, a still image file, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering and composition, layer processing, and the like.

The 2D graphics engine is a drawing engine for 2D drawing.

The HAL is an interface layer between an operating system kernel and a hardware circuit. The HAL layer includes but is not limited to a camera HAL module and an audio HAL module. The camera HAL module is configured to process an image stream, and the audio HAL module is configured to process an audio stream (for example, perform processing such as noise reduction and directional enhancement on the audio stream).

The kernel layer is a layer between hardware and software. The kernel layer includes at least a display driver, an audio driver, an image sensor drive module, an image signal processing module, and the like. The hardware includes at least a processor, a display screen, a camera lens, an ISP, and the like. The image signal processing module is configured to process an image preview request and an image photographing request based on an instruction of the camera HAL module, so that the image sensor drive module collects an image based on a corresponding request. The image signal processing module may be further configured to process a raw image collected by the camera lens, such as image denoising and image optimization.

It may be understood that the layers in the software structure shown in FIG. 2 and the components included in the layers do not constitute a specific limitation on the electronic device 100. In some other embodiments of this application, the electronic device 100 may include more or fewer layers than those shown in the figure, and each layer may include more or fewer components. This is not limited in this application.

It may be understood that, to implement the photographing method in the embodiments of this application, the electronic device includes corresponding hardware and/or software modules for performing various functions. Algorithm steps in the examples described with reference to the embodiments disclosed in this specification can be implemented by hardware or a combination of hardware and computer software in this application. Whether a specific function is performed by hardware or hardware driven by computer software depends on a particular application and a design constraint of the technical solutions. A person skilled in the art may use different methods to implement the described functions with reference to embodiments for each particular application, but it should not be considered that the implementation goes beyond the scope of this application.

First, some terms and related technologies used in this application are described for ease of understanding by a person skilled in the art.

Exposure is a basic process and main feature of all photochemical imaging methods. A visible image may be obtained through exposure. An exposure mode is a mode in which a computer uses a natural light source, and is generally divided into a plurality of modes, such as manual exposure and automatic exposure. Quality of a photo is related to exposure, that is, how much light should pass through, so that a photosensitive element can obtain a clear image. An exposure volume is determined by an exposure time and an aperture size.

Photosensitivity, also referred to as an ISO (International Organization for Standardization) value, is the measure of sensitivity of a film to light, is determined by sensitometry and several measured values, and has recently been standardized by the International Organization for Standardization. A less sensitive film requires a longer exposure time to achieve the same imaging as a more sensitive film, and is therefore commonly referred to as a slow film. Therefore, a highly sensitive film is referred to as a fast film. In both digital and film photography, to reduce the exposure time, relative use of high sensitivity generally degrades image quality (due to a coarse film grain or high image noise or another factor).

Exposure is a very important phase in shooting, and determines how much light the photosensitive element can obtain when obtaining an image. In other words, exposure determines brightness (namely, bright or dim) of an image. The exposure volume reflects how much light is exposed, and is a parameter specifically representing how much light is obtained by the photosensitive element. It may be learned from the definition of the exposure volume that the exposure volume is determined by the exposure time, a light-passing area, and ambient light intensity. A shutter speed determines the exposure time, and an aperture size determines the light-passing area. Generally, when shooting is performed under natural light, it is almost impossible to change ambient light. However, the ISO may affect sensitivity of the photosensitive element to light. Therefore, it may be considered that the ISO affects intensity of the ambient light obtained by the photosensitive element.

In conclusion, the exposure volume is affected by three factors: the exposure time (shutter speed), the aperture size, and the ISO, and the three factors that affect exposure may be referred to as exposure parameters. An EV (Exposure Value, exposure value) is a value that represents a light-passing capability of a photographic lens by using a combination of a shutter speed value and an aperture value. A lower shutter speed indicates a larger aperture and a larger light-passing time and area, namely, a larger exposure value.

The following describes a photographing scenario provided in an embodiment of this application. In this scenario, a mobile phone is used as an example for description.

It may be understood that the term "user interface" in the specification, claims, and accompanying drawings of this application is a medium interface for interaction and information exchange between an application or an operating system and a user, and the medium interface implements conversion between an internal form of information and a form acceptable to the user. The user interface is usually in a representation form of a graphical user interface (Graphic User Interface, GUI), and the graphical user interface is a user interface that is related to a computer operation and that is displayed in a graphical manner. The graphical user interface may be an interface element such as an icon, a window, or a control that is displayed on a display screen of an electronic device. The control may include visible interface elements such as an icon, a button, a menu, a tab, a text box, a dialog box, a status bar, a navigation bar, and a Widget.

Figure 3A:
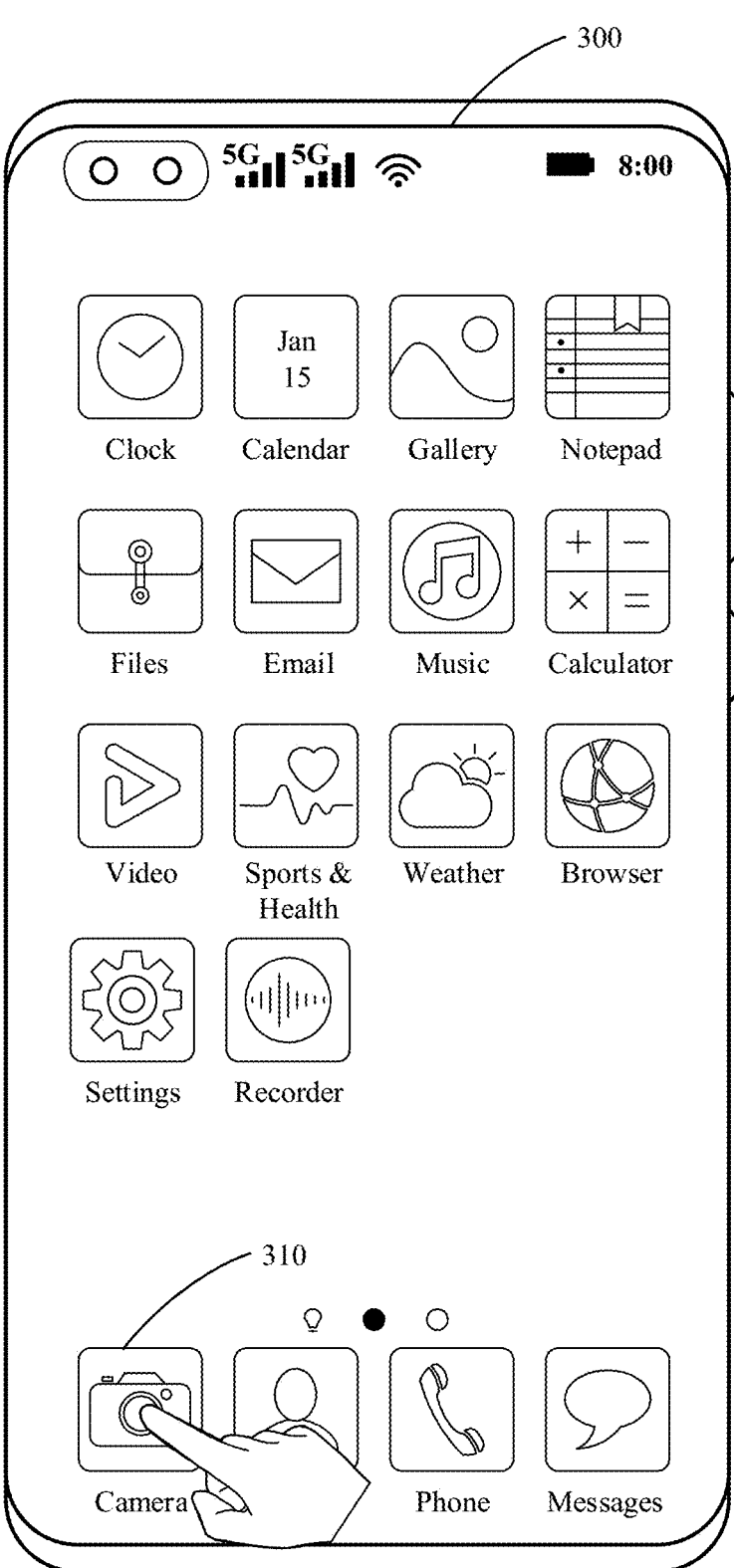
FIG. 3A shows an example of one of user interfaces of an electronic device.

FIG. 3A shows an example user interface 300 that is on a mobile phone and that is used to display an application. The user interface 300 displays a page on which application icons are placed. The page may include a plurality of application icons (for example, a clock application icon, a calendar application icon, a gallery application icon, a notepad application icon, an email application icon, an AppGallery application icon, a settings application icon, and the like). A page indicator may be further displayed below the plurality of application icons, to indicate a location relationship between the currently displayed page and another page. There are a plurality of tray icons (for example, a camera application icon 310, a contacts application icon, a phone application icon, and a messages application icon) below the page indicator. The tray icon remains displayed during page switching. Content displayed in the user interface 300 is not limited in this embodiment of this application.

It may be understood that the mobile phone may detect a user operation (for example, a touch/tap operation) performed by the user on the camera application icon 310. In response to the operation, the mobile phone may display a shooting interface 400 shown in FIG. 3B. The shooting interface 400 may be a user interface of a default photo mode of a camera application. The user may complete photographing in the interface. The camera application is an image shooting application on an electronic device such as a smartphone or a tablet computer. A name of the application is not limited in this application. In other words, the user may open the shooting interface 400 of the camera application by tapping the camera application icon 310. It may be understood that a default camera lens in the default photo mode is not limited to a rear-facing camera lens, and the mobile phone may alternatively set a front-facing camera lens to the default camera lens. In other words, after the camera application is started, the mobile phone may display, in a preview region 420, an image collected by the front-facing camera lens, which may be used by the user to perform photographing by using the default front-facing camera lens.

Figure 3B:
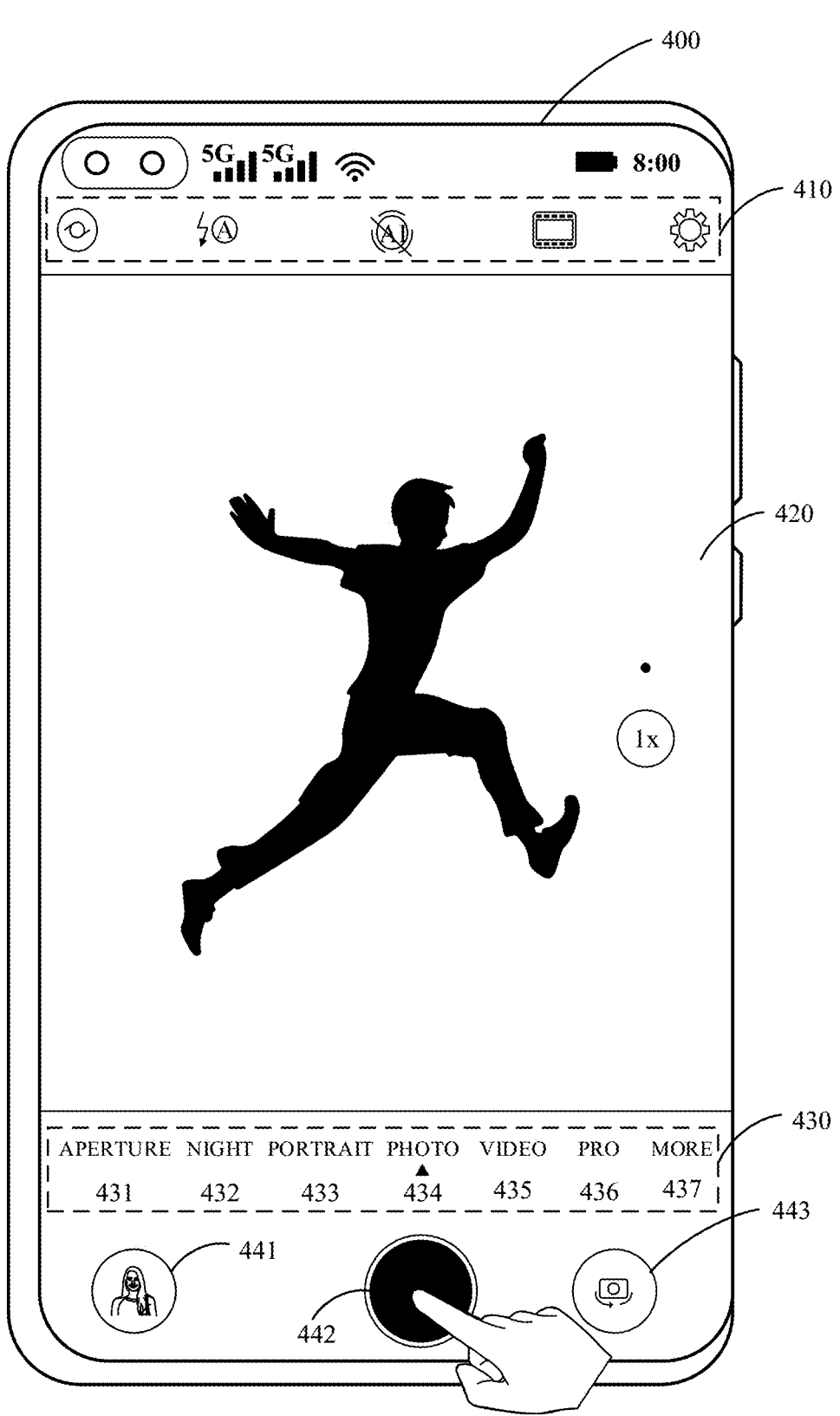
FIG. 3B shows an example of one of user interfaces of an electronic device.

FIG. 3B shows an example user interface 400 of a camera application in a mobile phone. As shown in FIG. 3B, the shooting interface 400 may include a parameter adjustment region 410, a preview region 420, a camera mode option region 430, a gallery shortcut control 441, a shutter control 442, and a camera lens flipping control 443. Each control in the parameter adjustment region 410 is used to adjust a corresponding shooting parameter, including but not limited to a flash setting control, an AI recognition switch setting control, a color standard setting control, and a more detailed camera setting control.

The preview region 420 may be used to display a preview image, and the preview image is an image collected by the mobile phone in real time by using a camera lens. The mobile phone may refresh display content in the preview region 420 in real time, so that the user previews an image collected by the camera lens currently.

One or more shooting mode options may be displayed in the camera mode option 430. The one or more shooting mode options may include an aperture mode option 431, a night mode option 432, a portrait mode option 433, a photo mode option 434, a video mode option 435, a professional mode option 436, and a "more" option 437. It may be understood that the one or more shooting mode options may be presented as text information in the interface, such as "aperture", "night", "portrait", "photo", "video", "professional", "more", or may be presented as an icon or another form of interactive element (interactive element, IE). This is not limited in this application.

When detecting a user operation performed on the shooting mode option, the mobile phone may enable a shooting mode selected by the user. In particular, when detecting a user operation performed on the "more" option 437, the mobile phone may further display more other shooting mode options, such as a time-lapse mode option and a burst mode option, so that richer shooting functions can be presented to the user. It may be understood that the camera mode option 430 may include more or fewer shooting mode options. The camera mode option shown in FIG. 3B is merely an implementation of this application, and should not be construed as a limitation on this application.

The gallery shortcut control 441 may be used to start a gallery application. In response to a user operation performed on the gallery shortcut control 441, for example, a touch operation, the mobile phone may start the gallery application.

The shutter control 442 may be used to monitor a user operation for triggering photographing. The mobile phone may detect a user operation performed on the shutter control 442. In response to the operation, the mobile phone obtains a corresponding image frame, composites an image to be finally output, and stores the image as a picture in the gallery application. In addition, the mobile phone may further display a thumbnail of the stored image in the gallery shortcut control 441. In other words, the user may trigger photographing by using an operation performed on the shutter control 442. It may be understood that the shutter control 442 may be a button or another form of control. This is not limited in this application.

The camera lens flipping control 443 may be used to monitor a user operation used to trigger flipping of the camera lens. The mobile phone may detect a user operation performed on the camera lens flipping control 443, such as a touch operation. In response to the operation, the mobile phone may switch a camera lens used for shooting, such as switch the rear-facing camera lens to the front-facing camera lens, or switch the front-facing camera lens to the rear-facing camera lens.

The shooting interface 400 may include more or fewer controls. This is not limited in this embodiment of this application.

Still referring to FIG. 3B, the user taps the shutter control 442. In response to the user operation, the camera application delivers a photographing request to a kernel (kernel) layer. Then, after receiving the photographing request, the kernel (kernel) layer reports, to a camera HAL module, a plurality of consecutive frames of image data subsequently output by an image sensor. The camera HAL module calls back (callback) a photographed frame and a thumbnail to the camera application. The camera application may confirm, based on the received photographed frame or thumbnail, that current photographing is completed. Then, the shutter control 442 is restored to an enabled state, so that the user can perform next photographing.

Currently, to improve photographing quality, an image to be finally output is generally composited based on a preview image frame collected by the electronic device in a state of a preview picture and a photographed image frame obtained in response to a photographing operation of the user. The preview image frame is collected based on an image preview request delivered by the camera application, and the photographed image frame is collected based on an image shooting request delivered by the camera application. It should be noted that, to improve quality of the image to be finally output, exposure parameters carried in the image preview request and the image shooting request are different, and the exposure parameter includes but is not limited to an EV value and an ISO value.

For example, when ambient light is dim, the exposure parameter carried in the image shooting request generated by the camera application in response to the user operation is stronger than the exposure parameter carried in the image preview request, so that brightness of an image frame collected by the image sensor based on the image shooting request is higher. For another example, when ambient light is bright, the exposure parameter carried in the image shooting request generated by the camera application in response to the user operation is weaker than the exposure parameter carried in the image preview request, to avoid unclear image details caused because an image frame collected by the image sensor based on the image shooting request is overexposed. Therefore, relative to the image preview request, the image shooting request may be referred to as a shooting request with changed image exposure.

Still referring to FIG. 3B, in a process of displaying a preview image in the preview region 420, the camera application delivers an image preview request to the kernel layer based on a preset frequency (for example, tens of times per second). After receiving the image preview request, the kernel layer drives the image sensor (sensor) to collect a preview image frame corresponding to the image preview request. Similarly, when the user taps the shutter control, the camera application delivers an image shooting request to the kernel layer in response to the user operation. After receiving the image shooting request, the kernel layer drives the image sensor to collect a shot image frame corresponding to the image shooting request. The shot image frame may be understood as an image frame obtained by changing an exposure parameter.

It should be noted that, in response to the user operation, the camera application may deliver one or more image shooting requests to the kernel layer. For different shooting modes, a quantity of image shooting requests delivered by the camera application to the kernel layer is not necessarily the same. For example, two or four image shooting requests may be delivered consecutively. Times of two adjacent image shooting requests may be the same, or may be different. Exposure parameters of image shooting requests delivered by the camera application to the kernel layer may be the same, or may be different. This is not limited in this embodiment of this application.

Figure 4A:
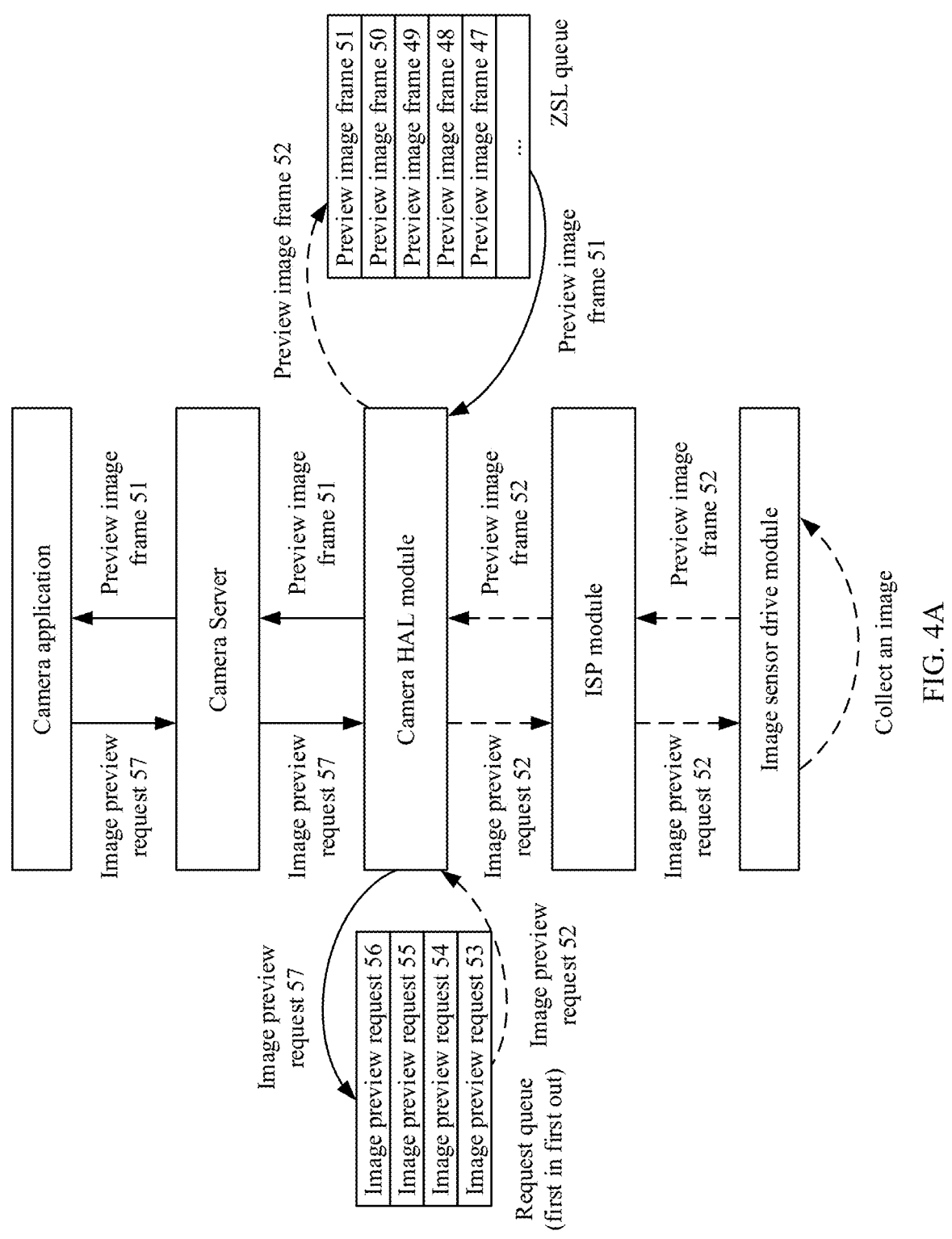
FIG. 4A shows an example of an existing processing procedure of an image preview request.
Figure 4B:
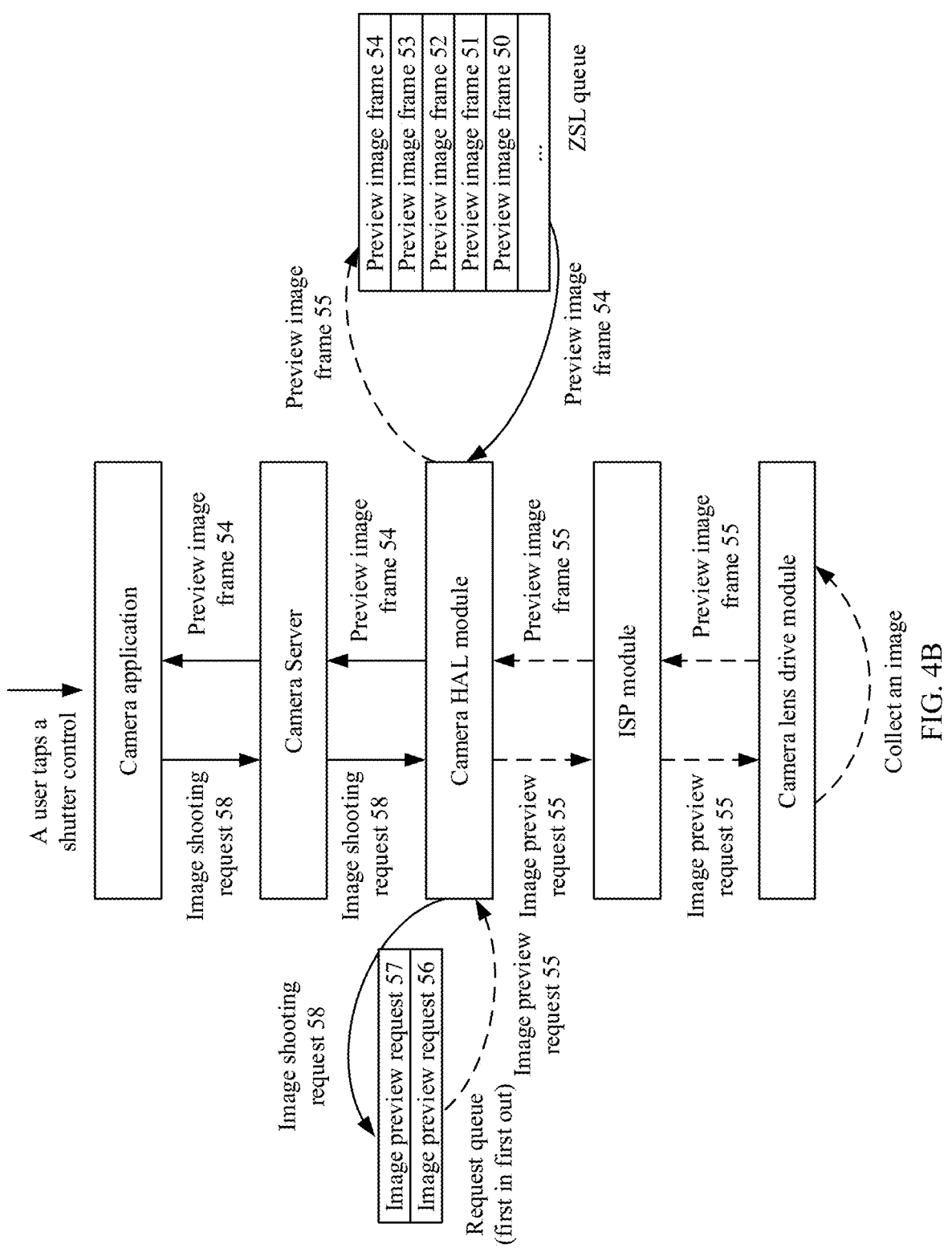
FIG. 4B shows an example of an existing processing procedure of an image shooting request.
Figure 4C:
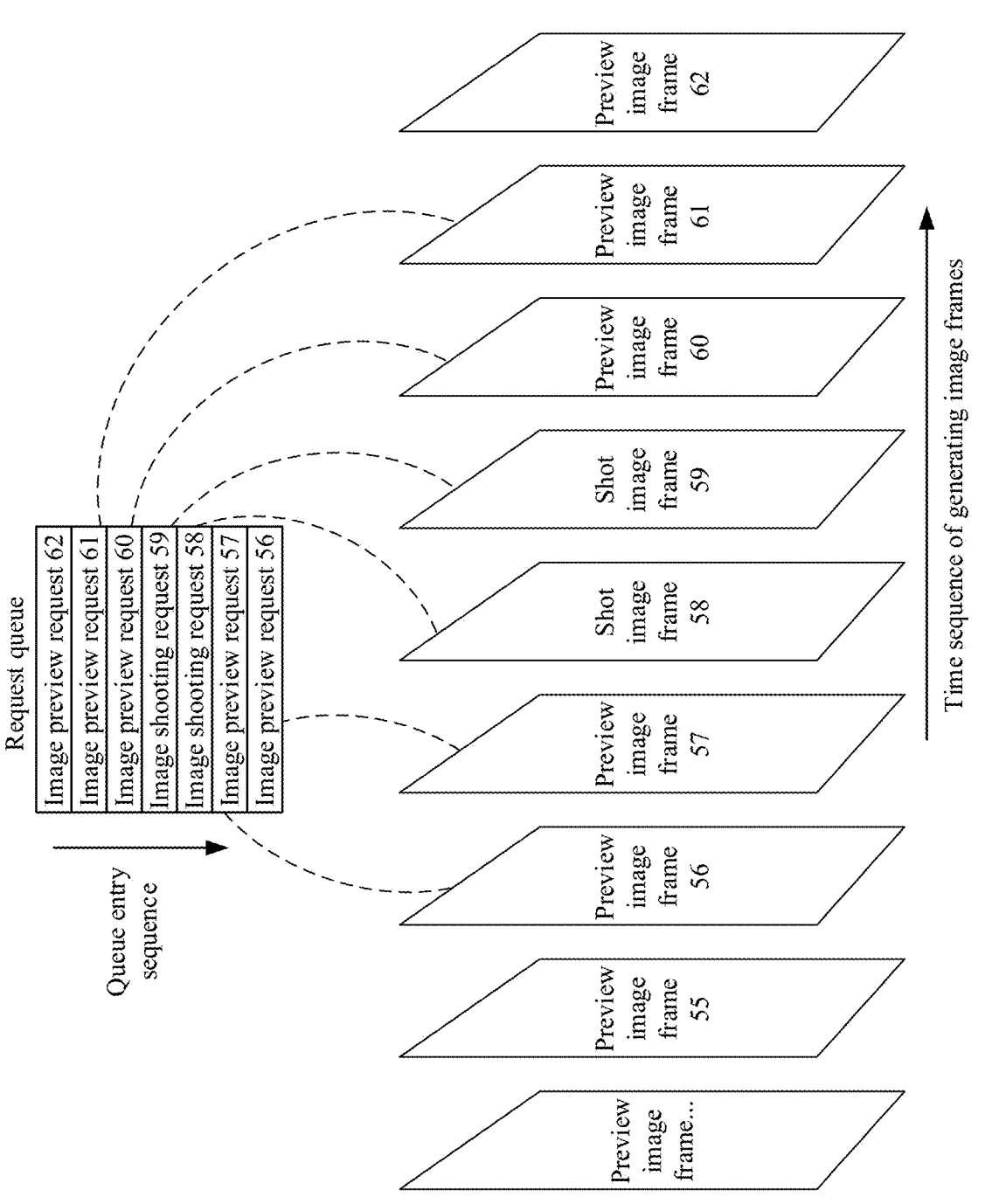
FIG. 4C shows an example of an existing image output sequence of a preview image frame and a shot image frame.

With reference to FIG. 4A-FIG. 4C, the following describes in detail processing procedures of an image preview request and an image shooting request in a multi-frame image composition photographing scenario.

Referring to FIG. 4A, for example, in a process of displaying a preview image in the preview region 420 of the camera application, the camera application generates an image preview request 57, and sends the image preview request 57 to the camera HAL module in the HAL by using a camera service (Camera Server). The image preview request 57 includes but is not limited to a request type, an exposure parameter (such as an EV value or an ISO value), resolution, a shake amount, and the like.

After receiving the image preview request 57, the camera HAL module stores the image preview request 57 in a request queue. The request queue sequentially stores requests from the camera application, including but not limited to an image preview request and an image shooting request. The request queue is a first in first out queue. The camera HAL module successively sends requests in the request queue to the ISP module at the kernel layer for processing.

Still referring to FIG. 4A, for example, the camera HAL module obtains an image preview request 52 from the request queue, and sends the image preview request 52 to the ISP module. The ISP module receives the image preview request 52, and sends the image preview request 52 to the image sensor drive module, so that the image sensor drive module drives the image sensor to collect image data based on an image collection parameter that matches the image preview request 52. Further, the image sensor drive module may send the image sensor to the ISP module based on a preview image frame 52 that matches the image preview request 52, to send the preview image frame 52 to the camera HAL module by using the ISP module. The ISP module may perform raw image data processing on the preview image frame, such as image denoising and image optimization.

After receiving the preview image frame 52, the camera HAL module stores the preview image frame 52 in a ZSL (Zero Shutter Lag, zero shutter lag) queue. The electronic device successively buffers a preview image and an actual shot image into an image queue based on a time sequence, and the image queue is referred to as a ZSL queue. It should be noted that an image in the ZSL queue is generally a RAW image. The ZSL queue is set to eliminate a delay existing when photographing is performed by using a camera of the mobile phone, and provide "shoot and view" experience.

It should be noted that all image frames stored in the ZSL queue are newly generated. A quantity of image frames stored in the ZSL queue is not limited in this embodiment of this application.

In a process of displaying a preview image in the preview region 420 of the camera application, the camera HAL module continuously reads a preview image from the ZSL queue, and sends the preview image to the camera application for display by using the Camera Server. For example, referring to FIG. 4A, the camera HAL module reads a preview image 51 from the ZSL queue, and sends the preview image 51 to the camera application for display by using the Camera Server.

It should be noted that in the foregoing procedure, the operation in which the camera HAL module stores the received image preview request in the request queue, the operation in which the camera HAL module reads the image preview request from the request queue and delivers the image preview request to the ISP module, and the operation in which the camera HAL module reads the preview image frame from the ZSL queue and sends the preview image frame to the camera application by using the camera service are performed asynchronously.

In the scenario shown in FIG. 4A, for example, a preview image frame 50 is being displayed, the preview image frame 51 is just produced to be displayed, and the preview image frame 52 is being produced. Meanwhile, a plurality of image preview requests whose preview image frames are to be generated further exist in the request queue. In the scenario shown in FIG. 4A, sequence numbers of the image preview request and the preview image frame are merely examples for expression. This is not limited in this embodiment of this application.

For example, it is assumed that when the camera application displays the preview image frame 50, the preview image frame 51 is just produced to be displayed, and the preview image frame 52 is being produced, the user taps the shutter control to trigger a photographing procedure of the camera application. In response to the user operation, the camera application sends an image shooting request to the camera HAL module by using the camera service. An exposure parameter corresponding to the image photographing request is different from an exposure parameter corresponding to the image preview request.

Referring to FIG. 4B, in response to the operation of tapping the shutter control by the user, the camera application generates an image shooting request 58, and sends the image shooting request 58 to the camera HAL module in the HAL by using the camera service. The image shooting request 58 includes but is not limited to a request type, an exposure parameter (such as an EV value or an ISO value), resolution, a shake amount, and the like. The exposure parameter corresponding to the image photographing request 58 is different from the exposure parameter corresponding to the image preview request 57.

After receiving the image shooting request 58, the camera HAL module stores the image shooting request 58 in the request queue. For example, referring to FIG. 4B, an image preview request 56 and the image preview request 57 that are not processed by the camera HAL module further exist in the request queue.

Still referring to FIG. 4B, for example, the camera HAL module obtains an image preview request 55 from the request queue, and sends the image preview request 55 to the ISP module. The ISP module receives the image preview request 55, and sends the image preview request 55 to the image sensor drive module, so that the image sensor drive module drives the image sensor to collect image data based on an image collection parameter that matches the image preview request 55. Further, the image sensor drive module may send the image sensor to the ISP module based on a preview image frame 55 that matches the image preview request 55, to send the preview image frame 55 to the camera HAL module by using the ISP module. The ISP module may perform raw image data processing on the preview image frame, such as image denoising and image optimization.

After receiving the preview image frame 55, the camera HAL module stores the preview image frame 55 in the ZSL queue, so that the camera HAL module obtains the preview image frame 55 from the ZSL queue and sends the preview image frame 55 to the camera application for display by using the camera service.

In a process of displaying a preview image in the preview region 420 of the camera application, the camera HAL module continuously reads a preview image from the ZSL queue, and sends the preview image to the camera application for display by using the Camera Server. For example, referring to FIG. 4B, the camera HAL module reads a preview image 54 from the ZSL queue, and sends the preview image 54 to the camera application for display by using the Camera Server.

Similarly, in the foregoing procedure, the operation in which the camera HAL module stores the received image shooting request in the request queue, the operation in which the camera HAL module reads the image preview request from the request queue and delivers the image preview request to the ISP module, and the operation in which the camera HAL module reads the preview image frame from the ZSL queue and sends the preview image frame to the camera application by using the camera service are performed asynchronously.

In response to the operation of tapping the shutter control by the user, if the camera application generates a plurality of image shooting requests, the camera application needs to successively send the plurality of image shooting requests to the camera HAL module, to store the plurality of image shooting requests in the request queue for processing. For example, it is assumed that in response to the operation of tapping the shutter control by the user, the camera application generates two image shooting requests, such as the image shooting request 58 and an image shooting request 59. For a delivery procedure of the image shooting request 59, refer to the delivery procedure of the image shooting request 58. Details are not described in this embodiment.

Still referring to FIG. 4B, only after the camera HAL module reads the image preview request 57 from the request queue, the camera HAL module continues to read the image shooting request 58 from the request queue, to collect a shot image frame 58 corresponding to the image shooting request 58.

After the shutter control is restored to an enabled state, the camera application continues to generate an image preview request based on a preset frequency, and delivers the image preview request to the camera HAL module by using the camera service, so that the preview region 420 of the camera application can continue to display a preview image.

As shown in FIG. 4C, a sequence in which the image preview request and the image shooting request enter the request queue is as follows: the image preview request 56, the image preview request 57, the image shooting request 58, the image shooting request 59, an image preview request 60, an image preview request 61, and an image preview request 62. The camera HAL module successively obtains, for processing, each image preview request or image shooting request based on a sequence in which the requests come out of the queue, to collect, by using the image sensor, an image frame corresponding to a corresponding image preview request or image shooting request. Therefore, image frames are successively generated based on the following sequence: a preview image frame 56, a preview image frame 57, the shot image frame 58, a shot image frame 59, a preview image frame 60, a preview image frame 61, and a preview image frame 62.

In a multi-frame composition shooting scenario, to implement a "shoot and view" effect, the preview image frame is read from the ZSL queue, and it is only necessary to change an exposure parameter to collect an image photographing frame (for example, the shot image frame 58 and the shot image frame 59) again. However, only after processing of each image preview request that is in the request queue and that enters the request queue before the image shooting request is completed, each image shooting request is processed. As a result, generation of the image shooting frame with changed exposure is affected, and a path delay of processing the image shooting request is generated.

To resolve the foregoing problem, an embodiment of this application provides a photographing method. In a photographing scenario in which an exposure parameter is changed, an image shooting request (whose exposure parameter is different from that of an image preview request) skips each image preview request in a request queue in an HAL, and is directly delivered to an ISP module through queue jump, to collect an image by using an image sensor, thereby shortening image output duration of a shot image frame.

Figure 5A:
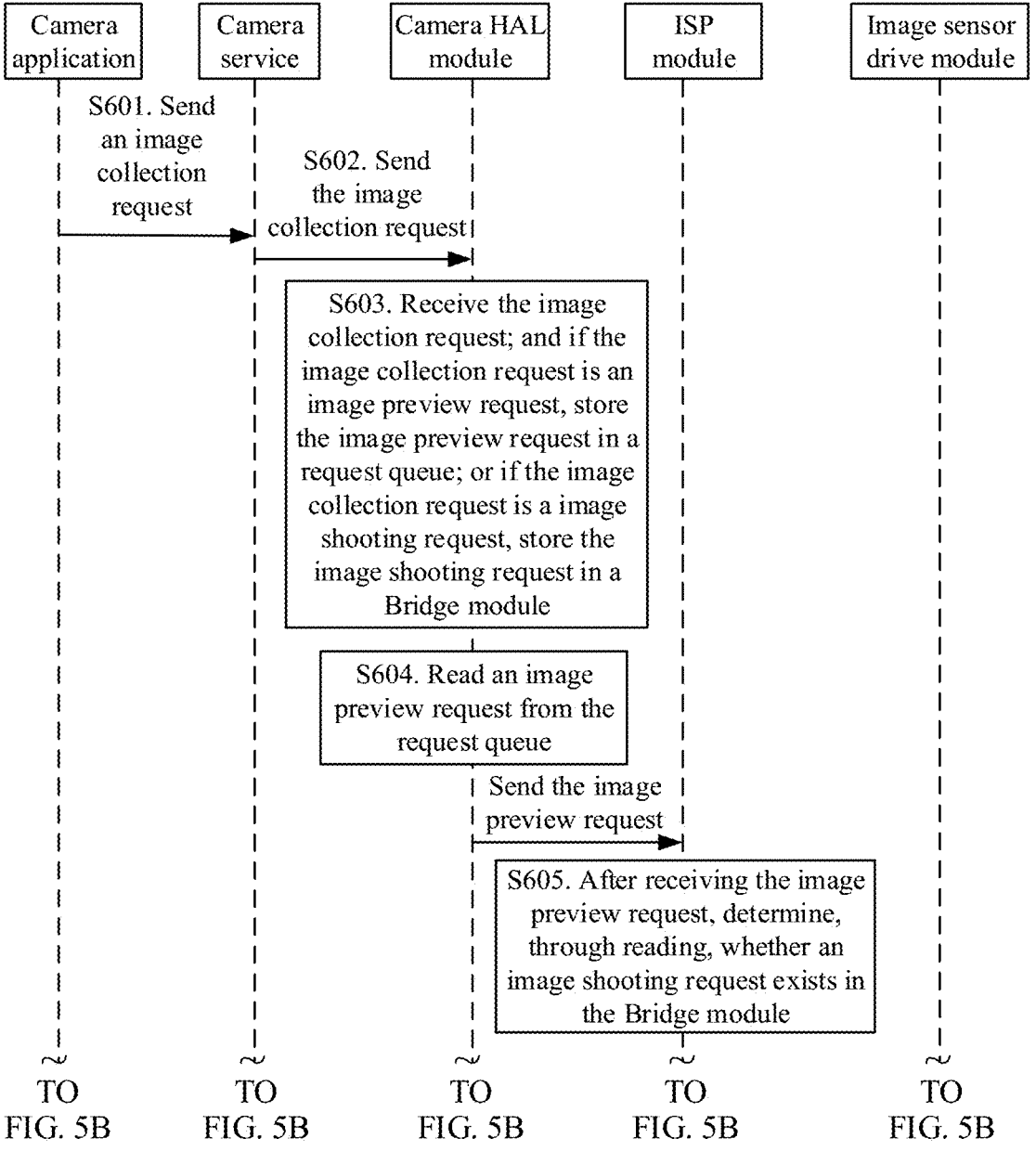
FIG. 5A and FIG. 5B are a schematic diagram of a photographing procedure according to an embodiment of this application.
Figure 5B:
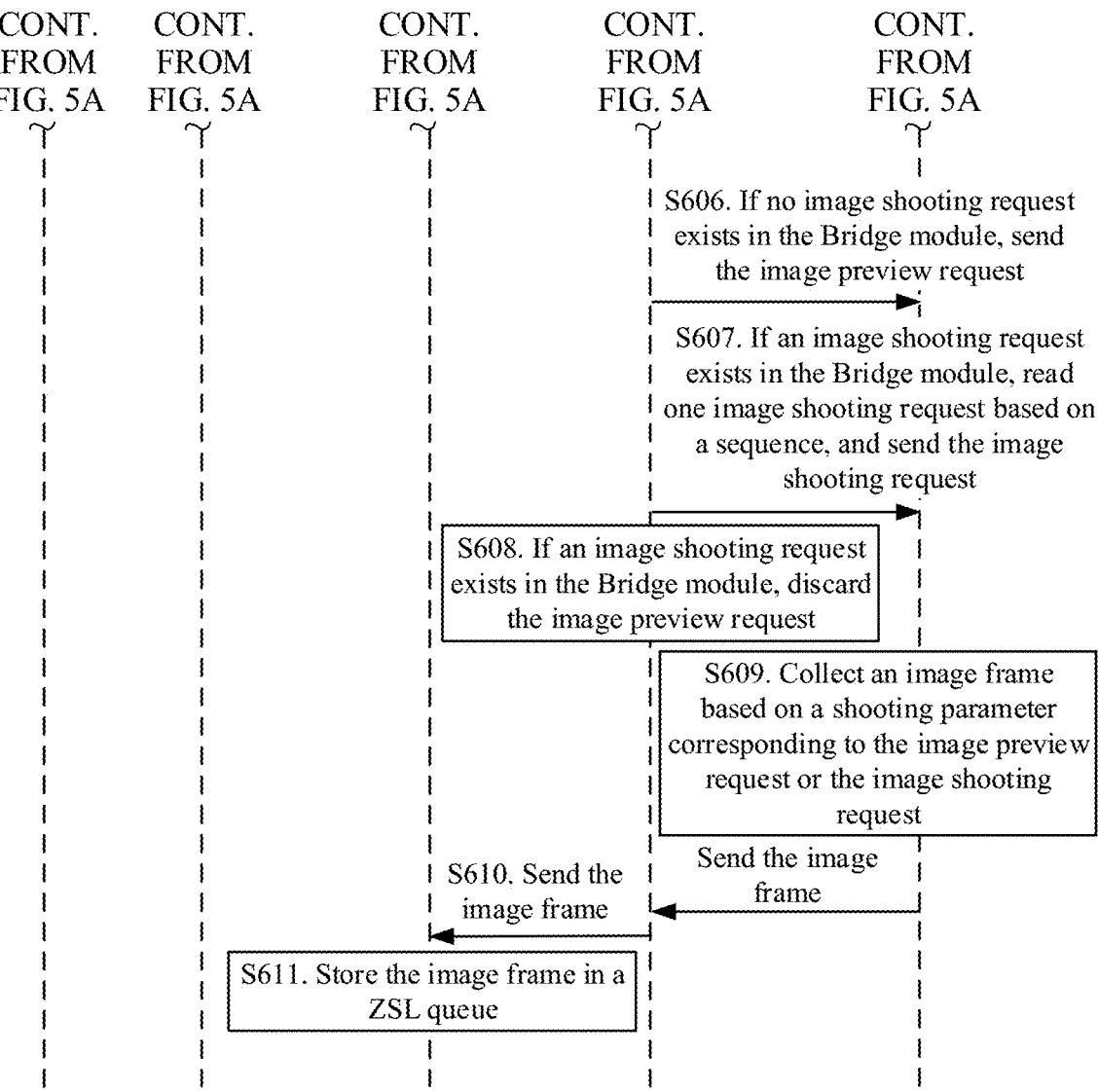

FIG. 5A and FIG. 5B are a schematic diagram of interaction between modules. Referring to FIG. 5A and FIG. 5B, a procedure of the photographing method provided in this embodiment of this application specifically includes the following steps.

S601. A camera application sends an image collection request to a camera service.

The image collection request may be an image preview request, or may be an image shooting request.

For example, in response to that a user taps an icon of the camera application, the camera application starts and sends a plurality of image preview requests to the camera service. In a process in which the camera application displays a preview image, the camera application continues to send an image preview request to the camera service based on a preset frequency.

For another example, in response to an operation of tapping a shutter control by a user, the camera application sends an image shooting request to the camera service. In different shooting modes, there may be one or more image shooting requests sent by the camera application. This is not limited in this embodiment.

The image collection request may include but is not limited to a request type, an exposure parameter (such as an EV value or an ISO value), resolution, a shake amount, and the like.

To improve quality of an image to be finally output, exposure parameters carried in the image preview request and the image shooting request are different, and the exposure parameter includes but is not limited to an EV value and an ISO value. For example, when ambient light is dim, the exposure parameter carried in the image shooting request generated by the camera application in response to the user operation is stronger than the exposure parameter carried in the image preview request, so that brightness of an image frame collected by the image sensor based on the image shooting request is higher. For another example, when ambient light is bright, the exposure parameter carried in the image shooting request generated by the camera application in response to the user operation is weaker than the exposure parameter carried in the image preview request, to avoid unclear image details caused because an image frame collected by the image sensor based on the image shooting request is overexposed. Therefore, relative to the image preview request, the image shooting request may be referred to as a shooting request with changed image exposure.

S602. The camera service sends the image collection request to a camera HAL module.

The camera service receives the image collection request, performs related processing corresponding to the image collection request, for example, creates a corresponding service instance, and sends the image collection request to the camera HAL module. For related processing of the camera service, refer to the existing technology. Details are not described herein again.

S603. The camera HAL module receives the image collection request. If the image collection request is an image preview request, the image preview request is stored in a request queue; or if the image collection request is an image shooting request, the image shooting request is stored in a Bridge module.

For example, after receiving the image collection request, the camera HAL module identifies, based on the request type carried in the image collection request, whether the image collection request is an image preview request or an image shooting request.

If an image preview request is received, the camera HAL module stores the image preview request in the request queue. The request queue is a first in first out queue.

If an image shooting request is received, the camera HAL module stores the image shooting request in the Bridge module. The Bridge module is only an example name, and may also be referred to as a priority module, a queue jump module, or the like.

In this embodiment of this application, the Bridge module is a module newly added to a system photographing path, and is configured to bridge the camera HAL module and an ISP module. The Bridge module is a singleton class, and is configured to store the image shooting request (whose exposure parameter is different from that of the image preview request). For example, the Bridge module may be implemented by using a first in first out queue.

In this way, different from the existing technology, the camera HAL separately stores the received image preview request and the received image shooting request, instead of storing both the image preview request and the image shooting request in the existing request queue.

Figure 6A:
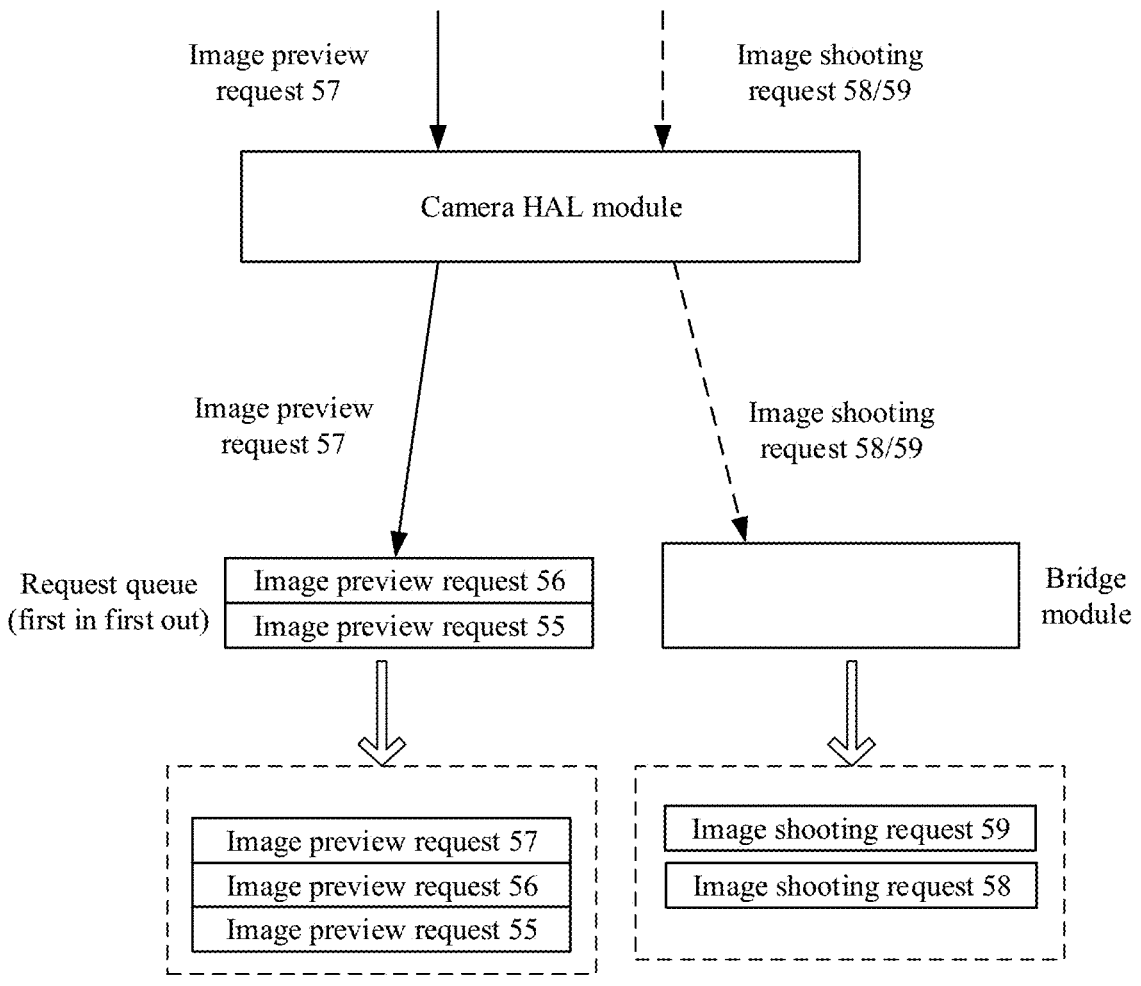
FIG. 6A is a schematic diagram of a storage procedure of an image preview request and an image shooting request according to an embodiment of this application.

As shown in FIG. 6A, for example, after receiving an image preview request 57, the camera HAL stores the image preview request 57 in the first in first out request queue.

Still referring to FIG. 6A, for example, after receiving an image shooting request 58, the camera HAL stores the image shooting request 58 in the Bridge module. Similarly, after receiving an image shooting request 59, the camera HAL stores the image shooting request 59 in the Bridge module. The image shooting request in the Bridge module is also stored based on a storage sequence.

S604. The camera HAL module reads an image preview request from the request queue, and sends the image preview request to the ISP module.

The camera HAL module reads the image preview request from the request queue, and sends an instruction and a corresponding image preview request to the ISP, to perform a corresponding operation by using the ISP module.

That the camera HAL module receives the request delivered by the camera application and stores the request and that the camera HAL module reads the image preview request from the request queue and delivers the image preview request to the ISP module are an asynchronous procedure. A sequence of performing S603 and S604 is not limited in this embodiment.

S605. After receiving the image preview request, the ISP module determines, through reading, whether an image shooting request exists in the Bridge module.

After receiving the image preview request delivered by the camera HAL module, the ISP module writes the image preview request into a corresponding register. Before delivering the image preview request to an image sensor drive module, the ISP module first determines, through reading, whether an image shooting request exists in the Bridge module.

S606. If no image shooting request exists in the Bridge module, the ISP module sends the image preview request to the image sensor drive module.

If the ISP module determines, through reading, that no image shooting request exists in the Bridge module, the ISP module directly sends, to the image sensor drive module, the image preview request that is written into the register, so that the image sensor can perform an image collection operation based on a corresponding image collection parameter.

S607. If an image shooting request exists in the Bridge module, the ISP module reads one image shooting request based on a sequence, and sends the image shooting request to the image sensor drive module.

If the ISP module determines, through reading, that an image shooting request exists in the Bridge module, the ISP module reads one image shooting request from the Bridge module, writes the image shooting request into a register, and sends the image shooting request to the image sensor drive module, so that the image sensor can perform an image collection operation based on a corresponding image collection parameter.

When only one image shooting request exists in the Bridge module, the ISP module reads the image shooting request, and delivers the image shooting request to the image sensor drive module. When a plurality of image shooting requests exist in the Bridge module, the ISP module reads one image shooting request based on a storage sequence, and delivers the image shooting request to the image sensor drive module.

S608. If an image shooting request exists in the Bridge module, the ISP module discards the image preview request.

Correspondingly, if the ISP module determines, through reading, that an image shooting request exists in the Bridge module, the ISP module discards the received image preview request, that is, discards the image preview request that is written into the register.

In this way, when an image shooting request exists in the Bridge module, the image preview request that the ISP module originally needs to deliver to the image sensor drive module is replaced with the image shooting request, and the corresponding image shooting request is delivered to the image sensor drive module for preferential processing.

S609. The image sensor drive module collects an image frame based on a shooting parameter corresponding to the image preview request or the image shooting request, and sends the image frame to the ISP module.

S610. The ISP module sends the image frame to the camera HAL module.

S611. The camera HAL module stores the image frame in a ZSL queue.

In a specific example, in response to the operation of tapping the shutter control by the user, the camera application delivers two image shooting requests (which are assumed to be the image shooting request 58 and the image shooting request 59). An exposure parameter of the image shooting request is different from an exposure parameter of an image preview request that is previously delivered.

Figure 6B:
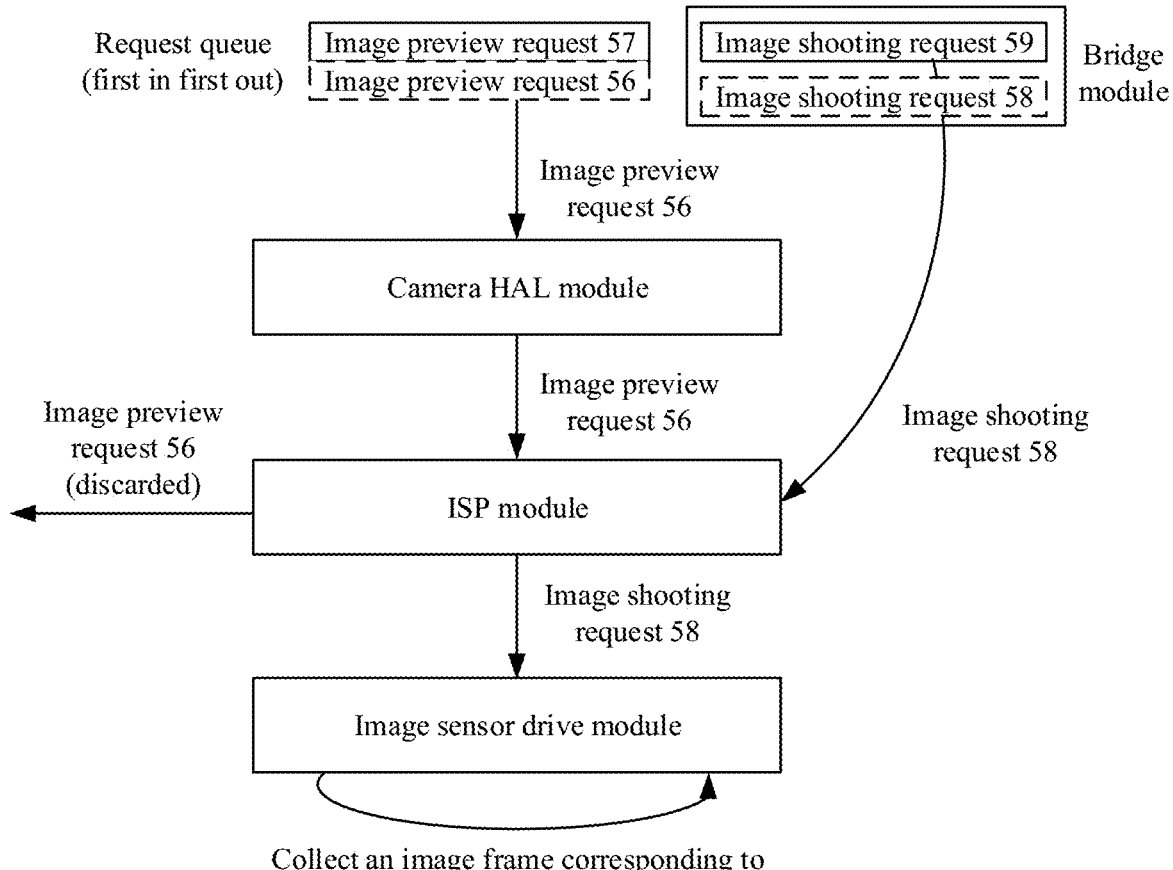
FIG. 6B shows an example of a processing procedure of an image preview request and an image shooting request according to an embodiment of this application.

As shown in FIG. 6B, for example, the camera HAL module reads an image preview request 56 from the request queue, and sends the image preview request 56 to the ISP module. Before the ISP module sends the image preview request 56 to the image sensor drive module, if the ISP module reads the image shooting request 58 from the Bridge module, the ISP module sends the image shooting request 58 to the image sensor drive module, and discards the image preview request 56. In this case, the image sensor drive module performs an image collection operation based on an image collection parameter corresponding to the image shooting request 58, to obtain a shot image frame 58 corresponding to the image shooting request 58. Therefore, image output duration of the shot image frame 58 is shortened.

Figure 6C:
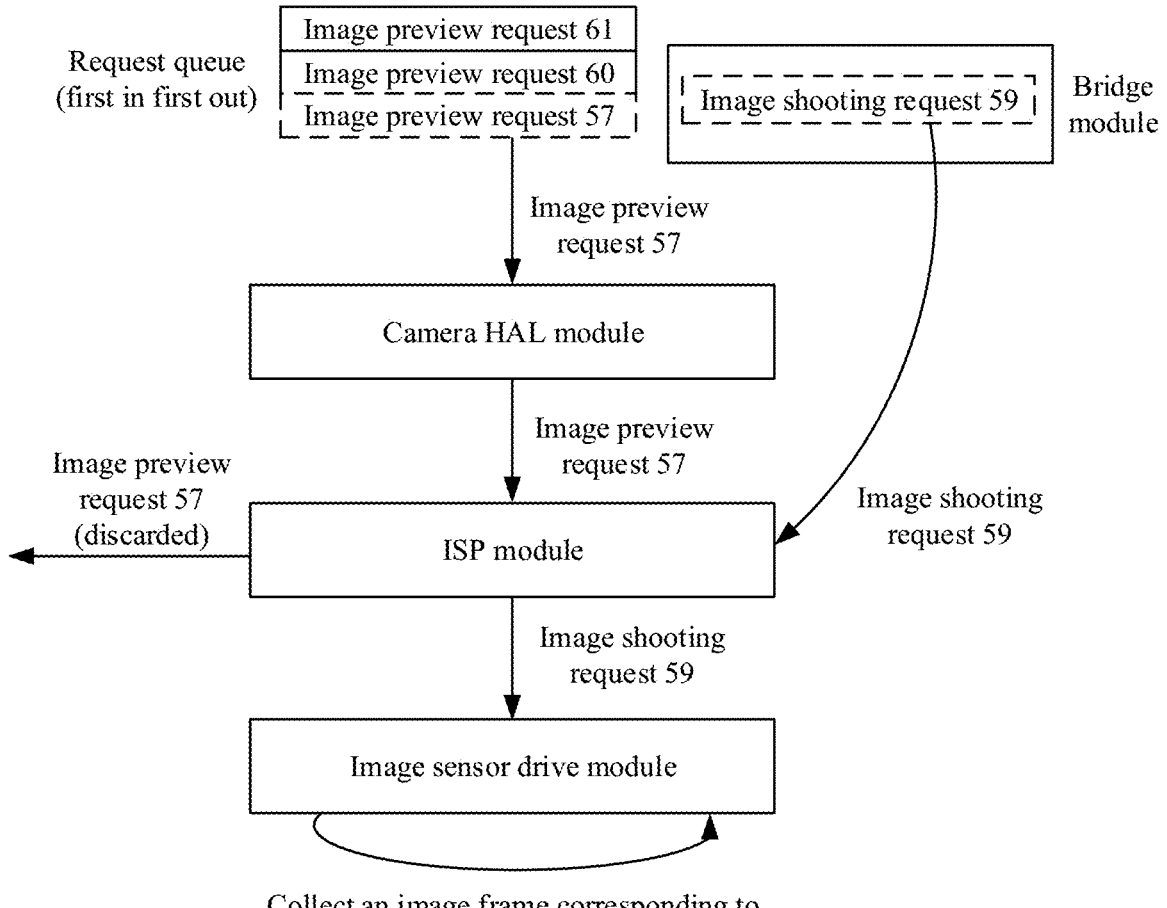
FIG. 6C shows an example of a processing procedure of an image preview request and an image shooting request according to an embodiment of this application.

Still referring to FIG. 6C, for example, the camera HAL module reads an image preview request 57 from the request queue, and sends the image preview request 57 to the ISP module. Before the ISP module sends the image preview request 57 to the image sensor drive module, if the ISP module reads the image shooting request 59 from the Bridge module, the ISP module sends the image shooting request 59 to the image sensor drive module, and discards the image preview request 57. In this case, the image sensor drive module performs an image collection operation based on an image collection parameter corresponding to the image shooting request 59, to obtain a shot image frame 59 corresponding to the image shooting request 59. Therefore, image output duration of the shot image frame 59 is shortened.

Figure 6D:
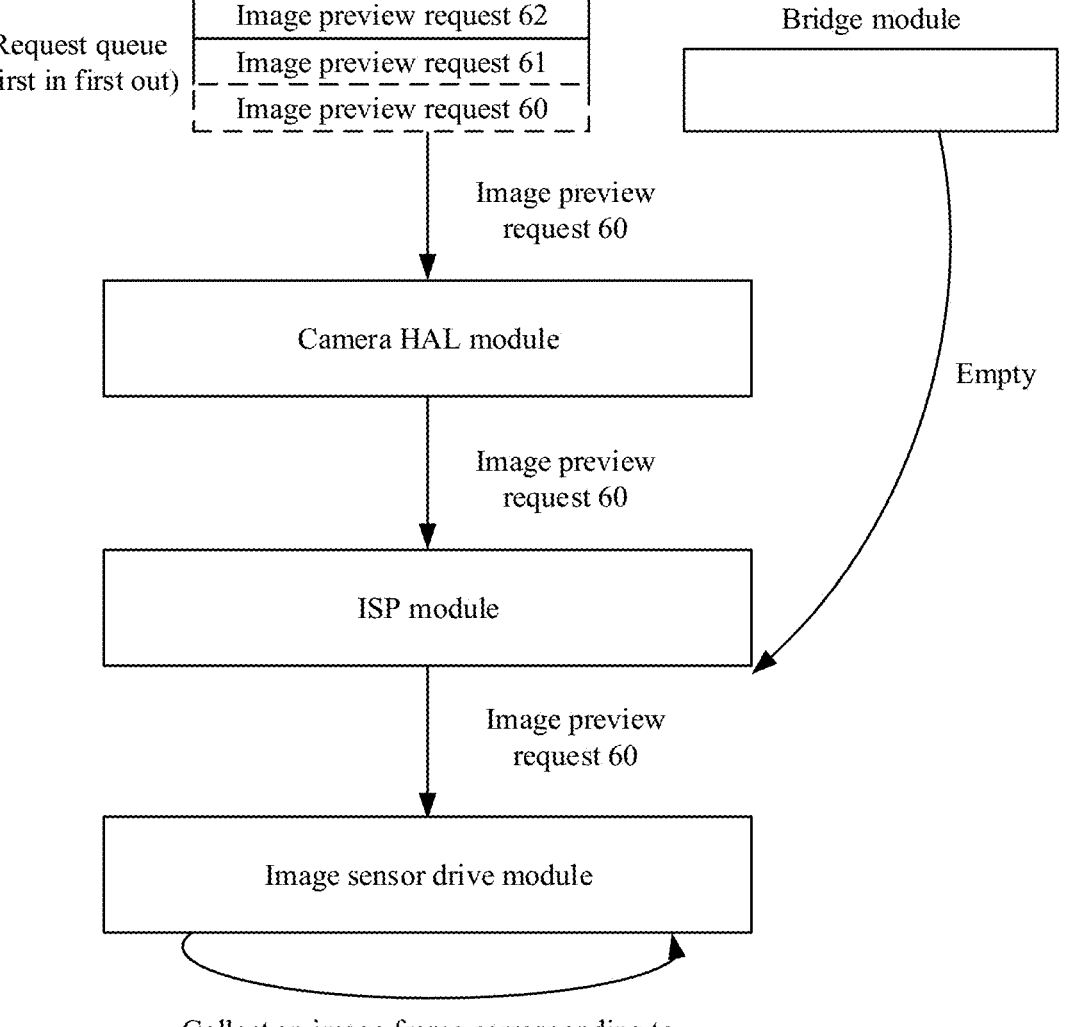
FIG. 6D shows an example of a processing procedure of an image preview request and an image shooting request according to an embodiment of this application.

Still referring to FIG. 6D, for example, the camera HAL module reads an image preview request 60 from the request queue, and sends the image preview request 60 to the ISP module. Before the ISP module sends the image preview request 60 to the image sensor drive module, if the ISP module reads no image shooting request from the Bridge module, the ISP module sends the image preview request 60 to the image sensor drive module. In this case, the image sensor drive module performs an image collection operation based on an image collection parameter corresponding to the image preview request 60, to obtain a preview image frame 60 corresponding to the image preview request 60.

In this way, to optimize photographing, in the photographing scenario in which the exposure parameter is changed, the image preview requests are still stored in the request queue and are successively processed, and the image shooting request (whose exposure parameter is different from that of the image preview request) is no longer stored in the request queue for processing based on a request sequence. Instead, the image shooting request skips each image preview request in the request queue in the HAL, and is directly delivered to the ISP module through queue jump, to collect an image by using the image sensor, thereby shortening image output duration of a shot image frame.

In a multi-frame fusion photographing scenario, because the image shooting request skips each image preview request in the request queue, interframe space between the shot image frame corresponding to the image shooting request and the preview image frame in the ZSL queue is smaller, so that continuity of a plurality of frames of images used to composite an image to be finally output is better, and an image effect of multi-frame image composition is better. In particular, in a dynamic photographing scenario, "ghosting" may exist in an image frame collected by the image sensor. Therefore, smaller interframe space between the shot image frame and the preview image frame indicates a smaller image difference between the shot image frame and the preview image frame, so that a final image obtained through multi-frame image composition has a better effect, thereby avoiding a problem of motion blur in the image.

Figure 7A:
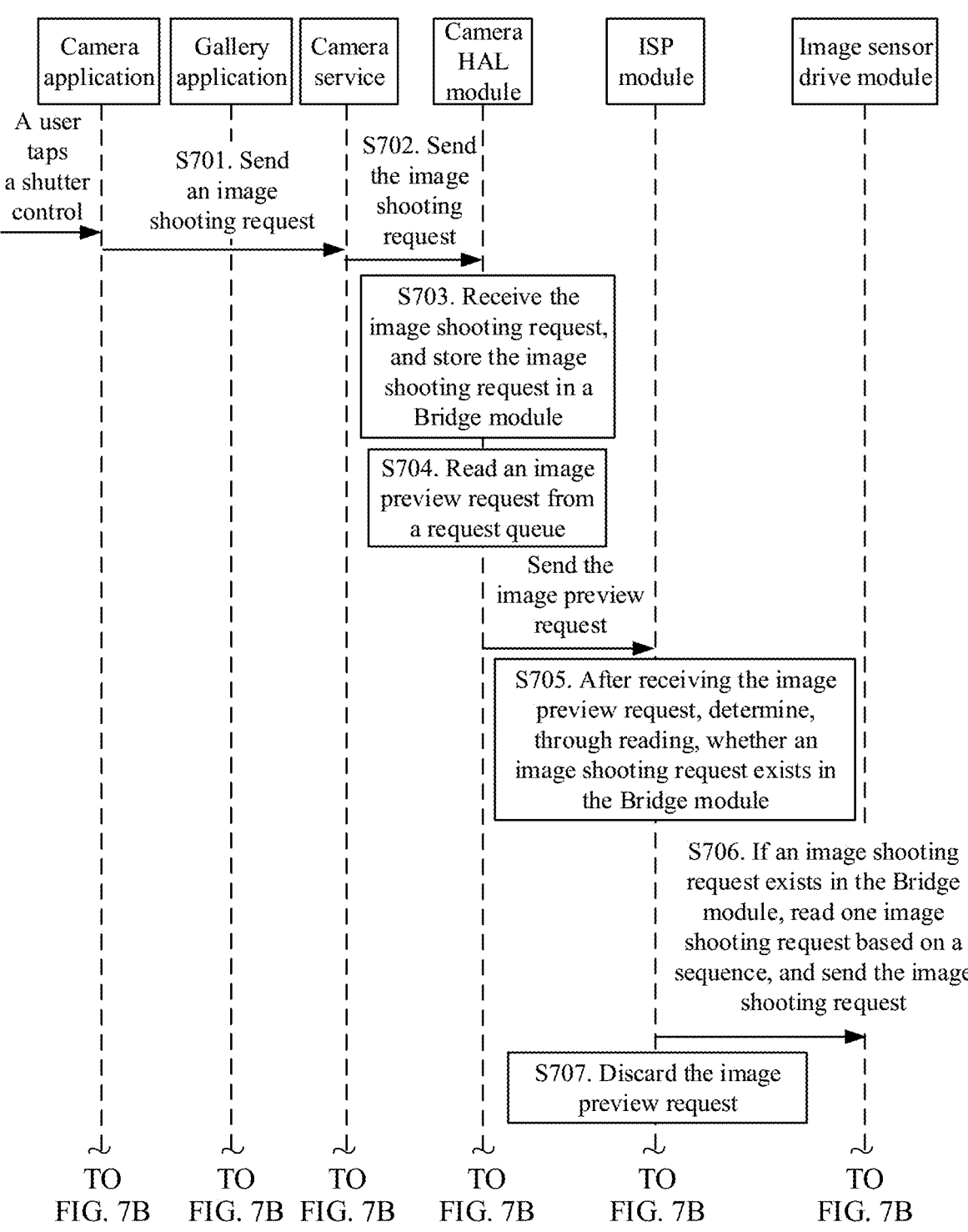
FIG. 7A and FIG. 7B are a schematic diagram of a photographing procedure according to an embodiment of this application.
Figure 7B:
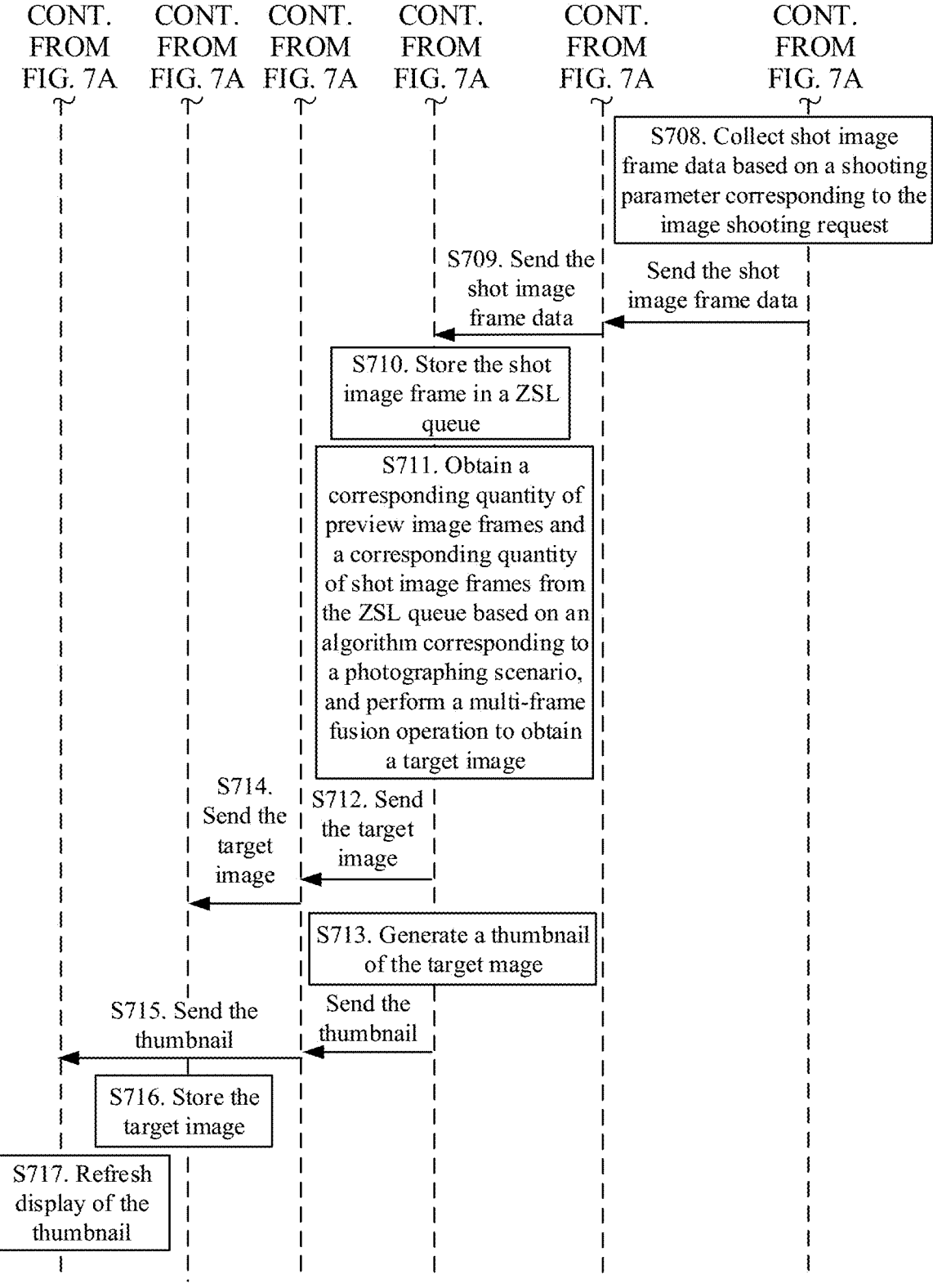

FIG. 7A and FIG. 7B are a schematic diagram of interaction between modules. Referring to FIG. 7A and FIG. 7B, a procedure of the photographing method provided in this embodiment of this application specifically includes the following steps.

S701. A camera application sends an image shooting request to a camera service in response to an operation of tapping a shutter control by a user.

For different shooting modes in which the camera application is located, for example, a high-light front-lighting mode, a high-light back-lighting mode, a wide aperture mode, a portrait mode, and a night mode, a quantity that is of shot image frames with changed exposure parameters and that is required by a multi-frame composition algorithm corresponding to the shooting mode is not necessarily the same, and a quantity of image shooting requests delivered by the camera application is not necessarily the same either. A quantity of image shooting requests is not limited in this embodiment.

For example, if the multi-frame composition algorithm requires seven image preview frames and two shot image frames with changed exposure parameters, the camera application successively delivers two image shooting requests.

For another example, if the multi-frame composition algorithm requires five image preview frames and four shot image frames with changed exposure parameters, the camera application successively delivers four image shooting requests.

Exposure parameters corresponding to different image shooting requests are not necessarily the same. This is not limited in this embodiment.

S702. The camera service sends the image shooting request to a camera HAL module.

The camera service receives the image shooting request, performs related processing corresponding to the image shooting request, for example, creates a corresponding service instance, and sends the image shooting request to the camera HAL module. For related processing of the camera service, refer to the existing technology. Details are not described herein again.

S703. The camera HAL module receives the image shooting request, and stores the image shooting request in a Bridge module.

Different from an image preview request, if an image shooting request is received, the camera HAL module stores the image shooting request in the Bridge module.

An example in which the camera application successively delivers two image shooting requests is used, for example, an image shooting request 58 and an image shooting request 59. In this case, the image shooting request 58 and the image shooting request 59 are stored in the Bridge module of the HAL. References may be made to FIG. 6A. Before and after this step, an image preview request delivered by the camera application is still stored in a request queue of the HAL.

S704. The camera HAL module reads an image preview request from the request queue, and sends the image preview request to an ISP module.

That the camera HAL module receives the request delivered by the camera application and stores the request and that the camera HAL module reads the image preview request from the request queue and delivers the image preview request to the ISP module are an asynchronous procedure. A sequence of performing S703 and S704 is not limited in this embodiment.

S705. After receiving the image preview request, the ISP module determines, through reading, whether an image shooting request exists in the Bridge module.

S706. If an image shooting request exists in the Bridge module, the ISP module reads one image shooting request from the Bridge module based on a sequence, and sends the image shooting request to an image sensor drive module.

S707. The ISP module discards the image preview request.

S708. The image sensor drive module collects a shot image frame based on a shooting parameter corresponding to the image shooting request, and sends the shot image frame to the ISP module.

Follow the foregoing example. Referring to FIG. 6B and FIG. 6C, an image preview request 56 and an image preview request 57 are discarded, and the image shooting request 58 and the image shooting request 59 are preferentially processed through queue jump, thereby shortening image output duration of the shot image frame 58 and the shot image frame 59.

S709. The ISP module sends the shot image frame to the camera HAL module.

The ISP module may further perform corresponding image processing on the shot image frame, such as image denoising and image optimization. This is not limited in this embodiment. For a procedure of processing the image frame by the ISP module, refer to the existing technology. Details are not described herein again.

S710. The camera HAL module stores the shot image frame in a ZSL queue.

S711. The camera HAL module obtains a corresponding quantity of preview image frames and a corresponding quantity of shot image frames from the ZSL queue based on an algorithm corresponding to a photographing scenario, and performs a multi-frame fusion operation to obtain a target image.

Figure 8A:
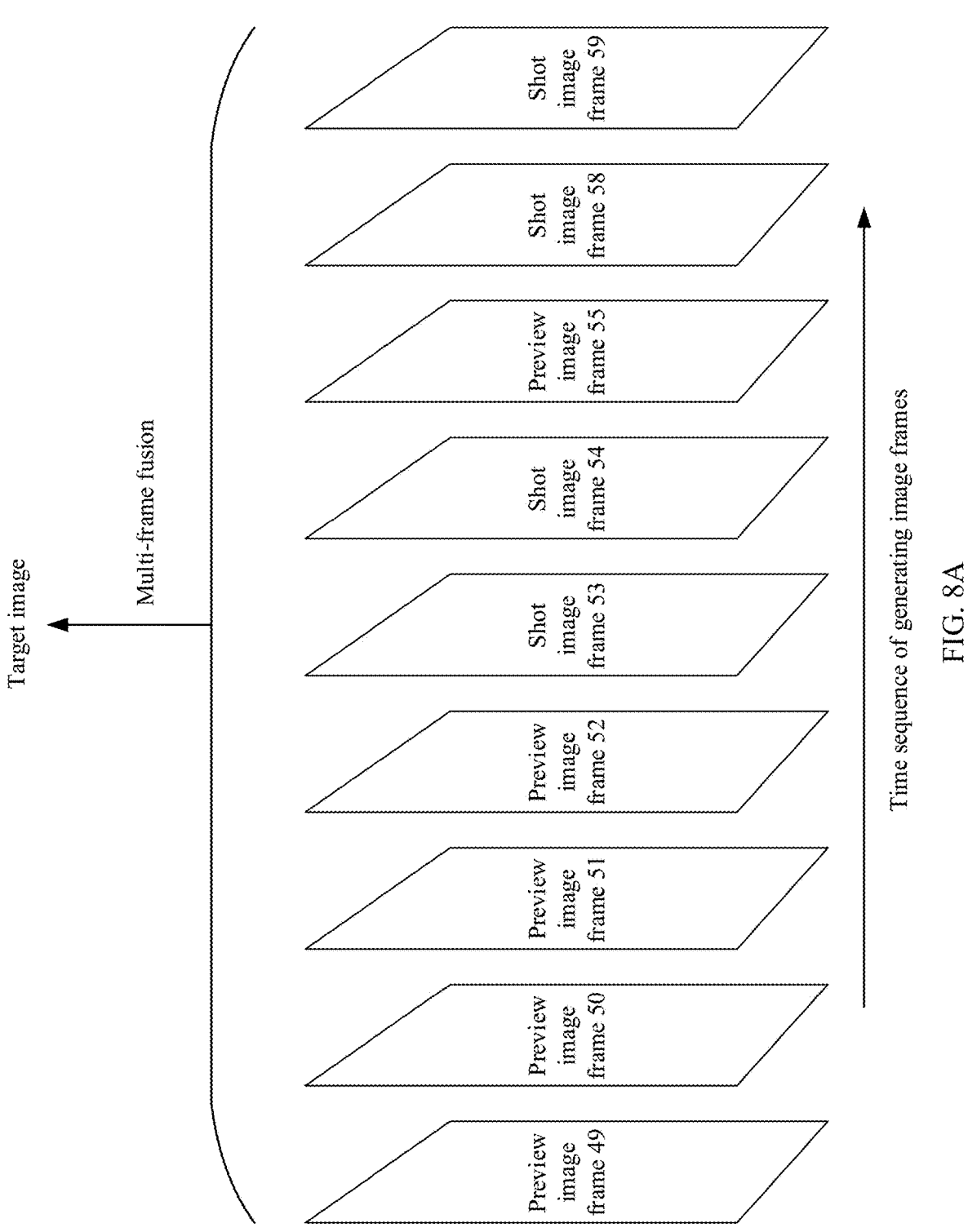
FIG. 8A shows an example of multi-frame image composition according to an embodiment of this application.

In the foregoing example, the camera HAL module successively stores the generated shot image frame 58 and the generated shot image frame 59 in the ZSL queue. FIG. 8A shows an example of an application scenario. As shown in FIG. 8A, image frames stored in the ZSL queue may include at least a preview image frame 49, a preview image frame 50, a preview image frame 51, a preview image frame 52, a preview image frame 53, a preview image frame 54, a preview image frame 55, the shot image frame 58, and the shot image frame 59.

In this example, the multi-frame composition algorithm requires seven image preview frames and two shot image frames with changed exposure parameters. In this case, the camera HAL may perform multi-frame fusion based on the preview image frame 49, the preview image frame 50, the preview image frame 51, the preview image frame 52, the preview image frame 53, the preview image frame 54, the preview image frame 55, the shot image frame 58, and the shot image frame 59 and by using a corresponding algorithm, to obtain a target image to be finally output.

The image shooting request 58 and the image shooting request 59 are preferentially processed through queue jump, and the image preview request 56 and the image preview request 57 are discarded. This shortens interframe space between the preview image frame 55 and the shot image frame 58, so that continuity of these image frames used for multi-frame fusion is better, and the target image obtained through multi-frame image composition has a better effect. In particular, in a dynamic photographing scenario, smaller interframe space between the shot image frame and the preview image frame indicates a smaller image difference between the shot image frame and the preview image frame, so that a final image obtained through multi-frame image composition has a better effect.

Figure 8B:
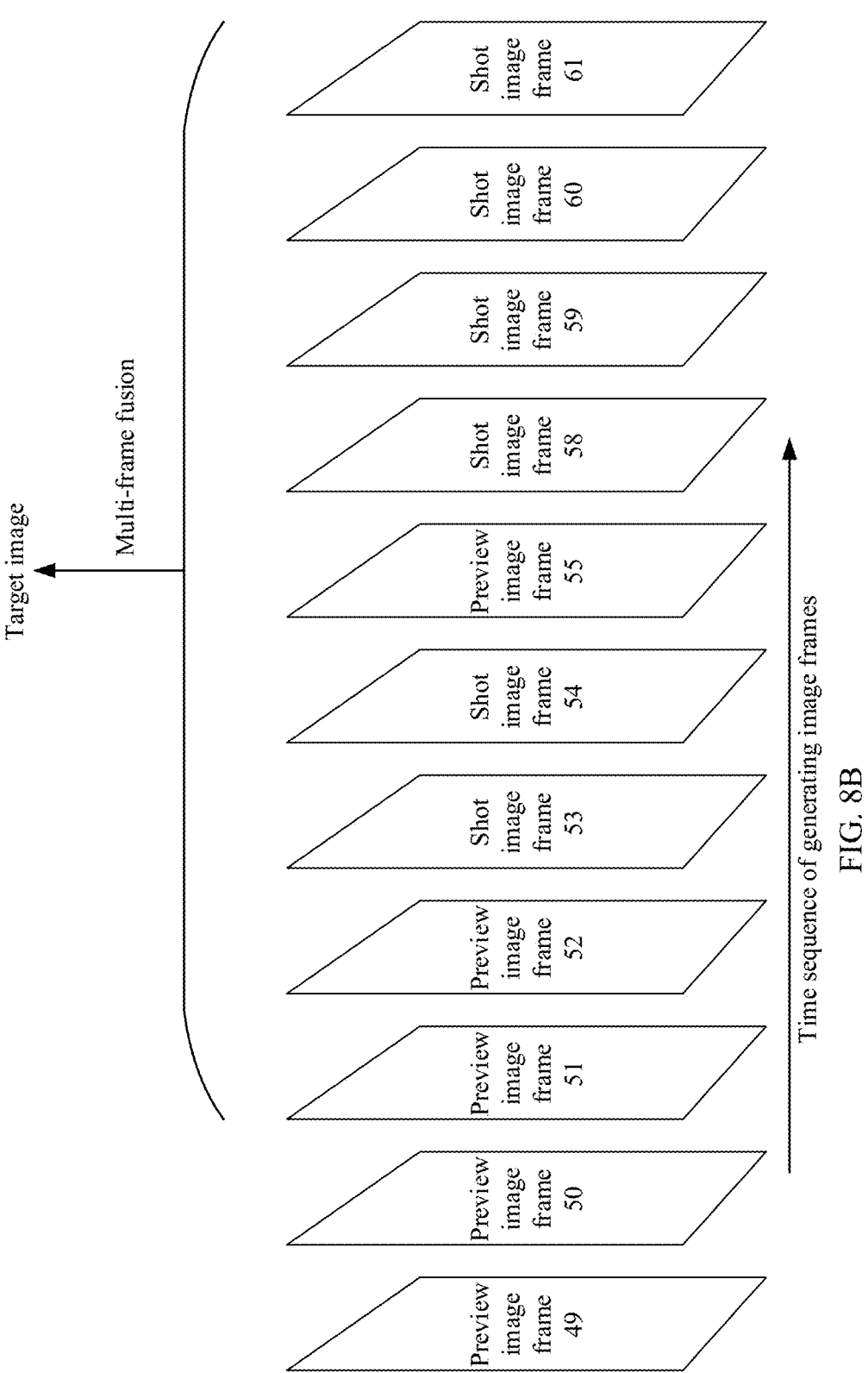
FIG. 8B shows an example of multi-frame image composition according to an embodiment of this application.

For another example, in a shooting mode, in response to the operation of tapping the shutter control by the user, the camera application successively delivers four image shooting requests with changed exposure parameters (for example, the image shooting request 58, the image shooting request 59, an image shooting request 60, and an image shooting request 61). In this case, the camera HAL module successively stores the generated shot image frame 58, the generated shot image frame 59, a generated shot image frame 60, and a generated shot image frame 61 in the ZSL queue. FIG. 8B shows an example of an application scenario. As shown in FIG. 8B, image frames stored in the ZSL queue may include at least a preview image frame 49, a preview image frame 50, a preview image frame 51, a preview image frame 52, a preview image frame 53, a preview image frame 54, a preview image frame 55, the shot image frame 58, the shot image frame 59, the shot image frame 60, and the shot image frame 61.

In this example, the multi-frame composition algorithm requires five image preview frames and four shot image frames with changed exposure parameters. In this case, the camera HAL may perform multi-frame fusion based on the preview image frame 51, the preview image frame 52, the preview image frame 53, the preview image frame 54, the preview image frame 55, the shot image frame 58, the shot image frame 59, the shot image frame 60, and the shot image frame 61 and by using a corresponding algorithm, to obtain a target image to be finally output.

The image shooting request 58, the image shooting request 59, the image shooting request 60, and the image shooting request 61 are preferentially processed through queue jump, and the image preview request 56 and the image preview request 57 are discarded. This shortens interframe space between the preview image frame 55 and the shot image frame 58, so that continuity of these image frames used for multi-frame fusion is better, and the target image obtained through multi-frame image composition has a better effect. In particular, in a dynamic photographing scenario, smaller interframe space between the shot image frame and the preview image frame indicates a smaller image difference between the shot image frame and the preview image frame, so that a final image obtained through multi-frame image composition has a better effect.

S712. The camera HAL module sends the target image to the camera service.

S713. The camera HAL module generates a thumbnail of the target image, and sends the thumbnail of the target image to the camera service.

A sequence of performing S712 and S713 is not limited in this embodiment.

S714. The camera service sends the target image to a gallery application.

S715. The camera service sends the thumbnail of the target image to the camera application.

S716. The gallery application stores the target image.

S717. The camera application refreshes display of the thumbnail.

In the foregoing procedure, when the camera application displays a preview window, the preview image is also refreshed in real time. For a refresh procedure of the preview image and a refresh procedure of the thumbnail, refer to the existing technology Details are not described herein again.

For details that are not described in this procedure, refer to the foregoing embodiments. Details are not described herein again.

Time for exposing one frame of image data by the image sensor is generally 33 ms. When a shot image frame with a changed exposure parameter jumps in a queue to be ahead of two image preview frames, overall photographing time may be reduced by 66 ms. In addition, interframe space between image frames used for multi-frame composition is smaller, and the composited target image has a better effect.

It should be noted that, in the foregoing embodiment, the camera application is used as an example for description, and another third-party application with a camera function is the same. Details are not described herein again.

An embodiment further provides a computer storage medium. The computer storage medium stores computer instructions. When the computer instructions are run on an electronic device, the electronic device is enabled to perform the related method steps to implement the photographing method in the foregoing embodiments.

An embodiment further provides a computer program product. When the computer program product runs on a computer, the computer is enabled to perform the related steps to implement the photographing method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the photographing method in the foregoing method embodiments.

The electronic device (for example, a mobile phone), the computer storage medium, the computer program product, or the chip provided in the embodiments is configured to perform the corresponding method provided above. Therefore, for beneficial effects that can be achieved by the electronic device, the computer storage medium, the computer program product, or the chip, refer to beneficial effects in the corresponding method provided above. Details are not described herein again.

It may be understood by a person skilled in the art from the foregoing descriptions of the implementations that, for convenience and brevity of description, division of the foregoing functional modules is merely used as an example for description. In an actual application, the foregoing functions may be allocated to different functional modules as required for implementation, that is, an internal structure of the apparatus is divided into different functional modules, to complete all or some of the functions described above.

In the several embodiments provided in this application, it should be understood that the disclosed apparatus and methods may be implemented in other manners. For example, the described apparatus embodiment is merely an example. For example, the division into the modules or units is merely a logical function division, and there may be another division manner in actual implementation. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or another form.

The foregoing embodiments are merely intended to describe the technical solutions in this application, but not intended to limit this application. Although this application is described in detail with reference to the foregoing embodiments, a person of ordinary skill in the art should understand that modifications may still be made to the technical solutions described in the foregoing embodiments or equivalent replacements may still be made to some technical features thereof. However, these modifications or replacements do not make the essence of the corresponding technical solutions depart from the scope of the technical solutions in the embodiments of this application.

The invention claimed is:

1. A photographing method, applied to an electronic device, the method comprising:
displaying an image preview interface of a target application, wherein the target application is an application with a camera function, and a preview image frame displayed in the image preview interface is collected based on an image preview request delivered by the target application, and wherein image preview requests are continuously delivered by the target application and stored in a request queue, and the request queue is a first in first out queue;
generating, by the target application, an image shooting request in response to a received user operation, wherein an exposure parameter of the image shooting request is different from an exposure parameter of the image preview request, wherein image shooting requests delivered by the target application are stored in a target module; and
when the image preview request is stored in the request queue and the image shooting request is stored in the target module at a same time, invoking an image sensor to collect a shot image frame corresponding to the image shooting request.

2. The method according to claim 1, wherein the electronic device comprises a camera hardware abstraction layer (HAL) module, an image signal processing (ISP) module, and an image sensor drive module, and the method comprises:
successively obtaining, by the camera HAL module, one image preview request from the request queue, and sending each successively obtained one image preview request to the ISP module;
receiving, by the ISP module, each successively obtained one image preview request; and
if reading an image shooting request from the target module, sending, by the ISP module, the image shooting request read from the target module to the image sensor drive module, so that the image sensor drive module drives the image sensor to collect a shot image frame corresponding to the image shooting request; or
if no image shooting request is read from the target module, sending, by the ISP module, an image preview request read from the request queue to the image sensor drive module, so that the image sensor drive module drives the image sensor to collect a preview image frame corresponding to the image preview request.

3. The method according to claim 2, further comprising:
if reading an image shooting request from the target module, discarding, by the ISP module, a corresponding image preview request.

4. The method according to claim 2, further comprising:
receiving, by the camera HAL module, an image preview request or an image shooting request that is delivered by the target application, storing the image preview request that is delivered by the target application in the request queue, and storing the image shooting request that is delivered by the target application in the target module.

5. The method according to claim 2, further comprising:
successively sending, by the ISP module to the camera HAL module, a preview image frame or a shot image frame that is fed back by the image sensor drive module; and
successively storing, by the camera HAL module, the preview image frames or the shot image frames in a zero shutter lag queue.

6. The method according to claim 5, further comprising:
in a multi-frame composition shooting scenario, reading, by the camera HAL module, a corresponding quantity of preview image frames and a corresponding quantity of shot image frames from the zero shutter lag queue, and performing a multi-frame image composition operation by using an image processing algorithm that matches a shooting mode, to obtain a target image, wherein the target image is used to be stored in a gallery application.

7. The method according to claim 1, wherein the target application is a camera application.

8. An electronic device, comprising:
one or more processors;
a memory; and
one or more computer programs, wherein the one or more computer programs are stored in the memory, and when the computer programs are executed by the one or more processors, the electronic device is enabled to:
display an image preview interface of a target application, wherein the target application is an application with a camera function, and a preview image frame displayed in the image preview interface is collected based on an image preview request delivered by the target application, and wherein image preview requests are continuously delivered by the target application and stored in a request queue, and the request queue is a first in first out queue;

generate, by the target application, an image shooting request in response to a received user operation, wherein an exposure parameter of the image shooting request is different from an exposure parameter of the image preview request, wherein image shooting requests delivered by the target application are stored in a target module; and when the image preview request is stored in the request queue and the image shooting request is stored in the target module at a same time, invoke an image sensor to collect a shot image frame corresponding to the image shooting request.

9. The electronic device according to claim 8, wherein the electronic device comprises a camera hardware abstraction layer (HAL) module, an image signal processing (ISP) module, and an image sensor drive module, and when the computer programs are executed by the one or more processors, the electronic device is enabled to:

successively obtain, by the camera HAL module, one image preview request from the request queue, and send each successively obtained one image preview request to the ISP module;

receive, by the ISP module, each successively obtained one image preview request; and if reading an image shooting request from the target module, send, by the ISP module, the image shooting request read from the target module to the image sensor drive module, so that the image sensor drive module drives the image sensor to collect a shot image frame corresponding to the image shooting request; or if no image shooting request is read from the target module, send, by the ISP module, an image preview request read from the request queue to the image sensor drive module, so that the image sensor drive module drives the image sensor to collect a preview image frame corresponding to the image preview request.

10. The electronic device according to claim 9, wherein when the computer programs are executed by the one or more processors, the electronic device is enabled further to:

if reading an image shooting request from the target module, discard, by the ISP module, a corresponding image preview request.

11. The electronic device according to claim 9, wherein when the computer programs are executed by the one or more processors, the electronic device is enabled further to:

receive, by the camera HAL module, an image preview request or an image shooting request that is delivered by the target application, store the image preview request that is delivered by the target application in the request queue, and store the image shooting request that is delivered by the target application in the target module.

12. The electronic device according to claim 9, wherein when the computer programs are executed by the one or more processors, the electronic device is enabled further to:

successively send, by the ISP module to the camera HAL module, a preview image frame or a shot image frame that is fed back by the image sensor drive module; and successively store, by the camera HAL module, the preview image frames or the shot image frames in a zero shutter lag queue.

13. The electronic device according to claim 12, wherein when the computer programs are executed by the one or more processors, the electronic device is enabled further to:

in a multi-frame composition shooting scenario, read, by the camera HAL module, a corresponding quantity of preview image frames and a corresponding quantity of shot image frames from the zero shutter lag queue, and perform a multi-frame image composition operation by using an image processing algorithm that matches a shooting mode, to obtain a target image, wherein the target image is used to be stored in a gallery application.

14. The electronic device according to claim 8, wherein the target application is a camera application.

15. A non-transitory computer-readable storage medium, comprising a computer program, wherein when the computer program is run on an electronic device, the electronic device is enabled to:

display an image preview interface of a target application, wherein the target application is an application with a camera function, and a preview image frame displayed in the image preview interface is collected based on an image preview request delivered by the target application, and wherein image preview requests are continuously delivered by the target application and stored in a request queue, and the request queue is a first in first out queue;

generate, by the target application, an image shooting request in response to a received user operation, wherein an exposure parameter of the image shooting request is different from an exposure parameter of the image preview request, wherein image shooting requests delivered by the target application are stored in a target module; and when the image preview request is stored in the request queue and the image shooting request is stored in the target module at a same time, invoke an image sensor to collect a shot image frame corresponding to the image shooting request.

16. The non-transitory computer-readable storage medium according to claim 15, wherein the electronic device comprises a camera hardware abstraction layer (HAL) module, an image signal processing (ISP) module, and an image sensor drive module, and when the computer program is run on the electronic device, the electronic device is enabled to:

successively obtain, by the camera HAL module, one image preview request from the request queue, and send each successively obtained one image preview request to the ISP module;

receive, by the ISP module, each successively obtained one image preview request; and if reading an image shooting request from the target module, send, by the ISP module, the image shooting request read from the target module to the image sensor drive module, so that the image sensor drive module drives the image sensor to collect a shot image frame corresponding to the image shooting request; or if no image shooting request is read from the target module, send, by the ISP module, an image preview request read from the request queue to the image sensor drive module, so that the image sensor drive module drives the image sensor to collect a preview image frame corresponding to the image preview request.

17. The non-transitory computer-readable storage medium according to claim 16, wherein when the computer program is run on the electronic device, the electronic device is enabled to:

if reading an image shooting request from the target module, discard, by the ISP module, a corresponding image preview request.

18. The non-transitory computer-readable storage medium according to claim 16, wherein when the computer program is run on the electronic device, the electronic device is enabled to:

receive, by the camera HAL module, an image preview request or an image shooting request that is delivered by the target application, store the image preview request that is delivered by the target application in the request queue, and store the image shooting request that is delivered by the target application in the target module.

19. The non-transitory computer-readable storage medium according to claim 16, wherein when the computer program is run on the electronic device, the electronic device is enabled to:

successively send, by the ISP module to the camera HAL module, a preview image frame or a shot image frame that is fed back by the image sensor drive module; and successively store, by the camera HAL module, the preview image frames or the shot image frames in a zero shutter lag queue.

20. The non-transitory computer-readable storage medium according to claim 15, wherein the target application is a camera application.

\* \* \* \* \*